US011872816B2

(12) United States Patent
Suzuki

(10) Patent No.: US 11,872,816 B2
(45) Date of Patent: Jan. 16, 2024

(54) RECORDING APPARATUS

(71) Applicant: SEIKO EPSON CORPORATION, Tokyo (JP)

(72) Inventor: Nobutaka Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 17/654,618

(22) Filed: Mar. 14, 2022

(65) Prior Publication Data

US 2022/0288937 A1 Sep. 15, 2022

(30) Foreign Application Priority Data

Mar. 15, 2021 (JP) ................................ 2021-041090

(51) Int. Cl.
*B41J 2/165* (2006.01)
*B41J 25/304* (2006.01)

(52) U.S. Cl.
CPC ....... *B41J 2/16544* (2013.01); *B41J 2/16511* (2013.01); *B41J 2/16538* (2013.01); *B41J 25/304* (2013.01)

(58) Field of Classification Search
CPC ................ B41J 2/16544; B41J 2/16511; B41J 2/16538; B41J 25/304
See application file for complete search history.

(56) References Cited

U.S. PATENT DOCUMENTS 5,300,952 A * 4/1994 Wada ..................... G03G 15/32 347/217
2021/0237480 A1* 8/2021 Amano .................. B41J 25/316

FOREIGN PATENT DOCUMENTS

JP 3589584 B2 * 11/2004
JP 2012-158036 A 8/2012

* cited by examiner

*Primary Examiner* — Sharon Polk
(74) *Attorney, Agent, or Firm* — WORKMAN NYDEGGER

(57) ABSTRACT

A recording apparatus includes: a recording section that is configured to move between a first position at which a liquid ejecting section performs recording on a medium transported on a transport path and a second position at which the recording section is retreated from the transport path; a wiper that wipes a liquid ejection surface of the liquid ejecting section by moving in a direction extending along the liquid ejection surface in a state in which the recording section is at the second position; and a regulating unit that is configured to switch between a regulating state in which regulating of movement of the recording section in the first direction is performed and a non-regulating state in which the regulating is not performed and that has the regulating state when the recording section is at the second position.

15 Claims, 16 Drawing Sheets

RECORDING APPARATUS

The present application is based on, and claims priority from JP Application Serial Number 2021-041090, filed Mar. 15, 2021, the disclosure of which is hereby incorporated by reference herein in its entirety.

BACKGROUND

1. Technical Field

The present disclosure relates to a recording apparatus that performs recording on a medium.

2. Related Art

JP-A-2012-158036 discloses a recording apparatus configured such that a rack-and-pinion mechanism enables an ink jet head to be raised/lowered with respect to a platen. In the recording apparatus, the ink jet head is raised/lowered to move between a recording position at which recording is performed on a sheet and a wiping position at which a wiper wipes an ink ejection surface.

When the wiper wipes the ink ejection surface of the ink jet head, the ink jet head is subjected to an external force resulting from elasticity of the wiper. In such an instance, in a configuration as described in JP-A-2012-158036 in which the ink jet head is movable, the ink jet head moves due to, for example, backlash of a gear; in other words, the ink jet head moves in a direction away from the wiper, and it may thus be difficult to appropriately wipe the ink ejection surface.

SUMMARY

To address the aforementioned problem, a recording apparatus of the disclosure includes: a transport path on which a medium is transported; a recording section that includes a liquid ejecting section for ejecting a liquid onto the medium and that is configured to move between a first position at which the liquid ejecting section performs recording on the medium transported on the transport path and a second position at which the recording section is retreated from the transport path; a moving unit that moves the recording section in a first direction in which the recording section retreats from the transport path and a second direction in which the recording section advances to the transport path; a wiper that wipes a liquid ejection surface of the liquid ejecting section by moving in a direction extending along the liquid ejection surface when the recording section is at the second position; and a regulating unit that is configured to switch between a regulating state in which regulating of movement of the recording section in the first direction is performed and a non-regulating state in which the regulating is not performed and that has the regulating state when the recording section is at the second position.

DESCRIPTION OF EXEMPLARY EMBODIMENTS

Figure 1:
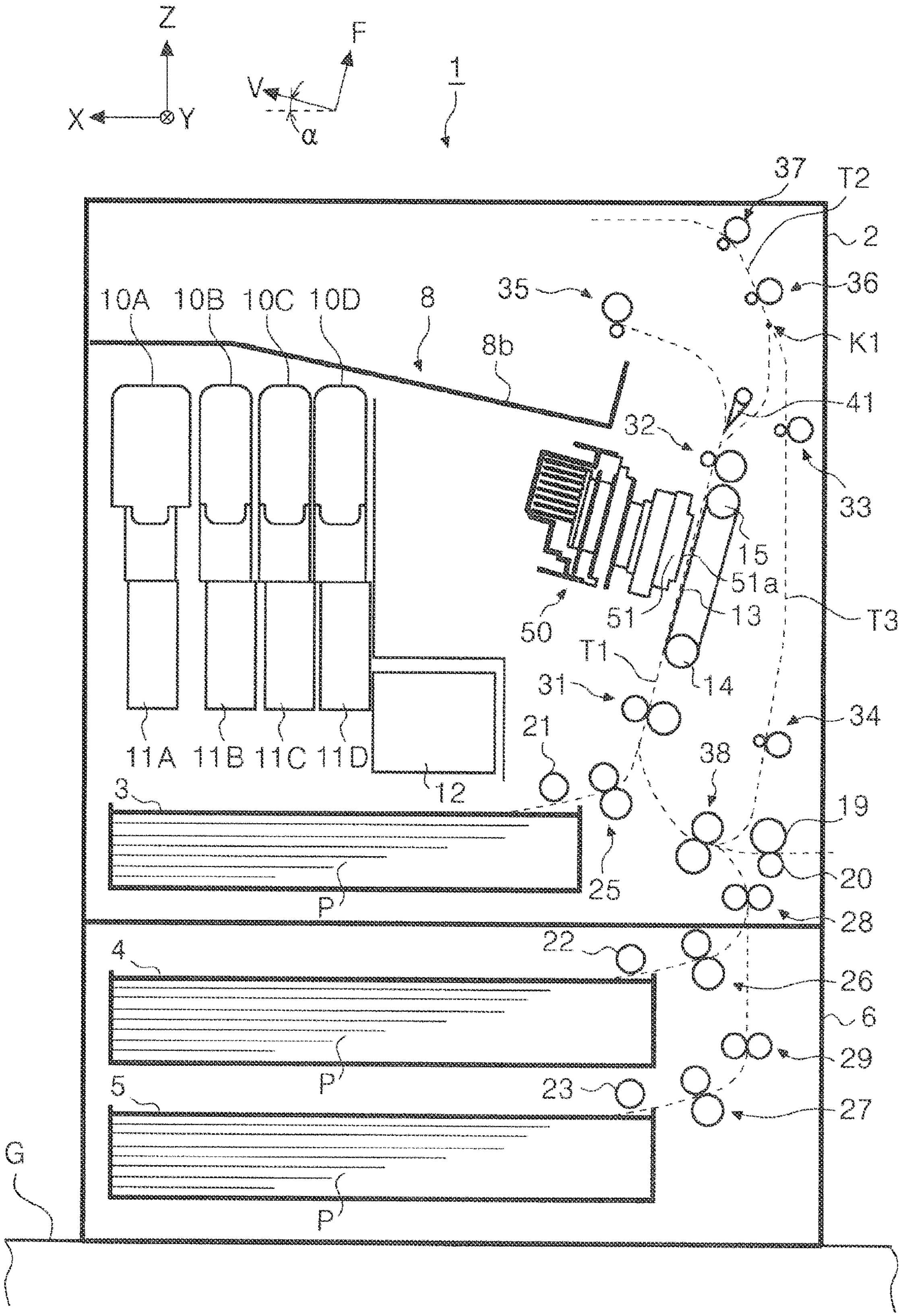
FIG. 1 illustrates a medium-transport path of a printer and a state in which a head unit is at a first position.

Hereinafter, the disclosure will be schematically described.

A recording apparatus according to a first aspect includes: a transport path on which a medium is transported; a recording section that includes a liquid ejecting section for ejecting a liquid onto the medium and that is configured to move between a first position at which the liquid ejecting section performs recording on the medium transported on the transport path and a second position at which the recording section is retreated from the transport path; a moving unit that moves the recording section in a first direction in which the recording section retreats from the transport path and a second direction in which the recording section advances to the transport path; a wiper that wipes a liquid ejection surface of the liquid ejecting section by moving in a direction extending along the liquid ejection surface when the recording section is at the second position; and a regulating unit that is configured to switch between a regulating state in which regulating of movement of the recording section in the first direction is performed and a non-regulating state in which the regulating is not performed and that has the regulating state when the recording section is at the second position.

According to the present aspect, since the recording apparatus includes the regulating unit that is configured to switch between the regulating state in which regulating of movement of the recording section in the first direction is performed and the non-regulating state in which the regulating is not performed and that has the regulating state when the recording section is at the second position, it is possible to suppress the recording section from moving in a direction away from the wiper and appropriately wipe the liquid ejection surface.

According to a second aspect, a movement direction of the recording section of the first aspect intersects a horizontal direction and a vertical direction.

According to the present aspect, since the movement direction of the recording section intersects the horizontal direction and the vertical direction, it is possible to keep a balance of a space required for movement of the recording section between a size in the horizontal direction and a size in the vertical direction and suppress an excessive size increase of the apparatus in the horizontal direction and the vertical direction.

According to a third aspect, the movement direction of the recording section of the second aspect forms an acute angle smaller than 45° with respect to the horizontal direction.

According to the present aspect, since the movement direction of the recording section forms the acute angle smaller than 45° with respect to the horizontal direction, the influence of gravity acting on the recording section when the recording section moves in the movement direction is significantly reduced, and a problem of the recording section moving in the direction away from the wiper due to being subjected to a force from the wiper is readily caused. However, according to the first aspect, it is possible to suppress the recording section from moving in the direction away from the wiper and appropriately wipe the liquid ejection surface.

According to a fourth aspect, the moving unit of any of the first to third aspects includes a rack-and-pinion mechanism.

According to the present aspect, since the moving unit includes the rack-and-pinion mechanism, a problem of the recording section moving in the direction away from the wiper due to being subjected to a force from the wiper is readily caused by backlash of a gear. However, according to the first aspect, it is possible to suppress the recording section from moving in the direction away from the wiper and appropriately wipe the liquid ejection surface.

According to a fifth aspect, the regulating unit of any of the first to fourth aspects is configured to have a state switched by the recording section in accordance with a moving operation of the recording section.

According to the present aspect, since the regulating unit is configured to have a state switched by the recording section in accordance with the moving operation of the recording section, a power source for switching the state of the regulating unit is not required, thus making it possible to suppress a cost increase and a size increase of the apparatus.

According to a sixth aspect, the regulating unit of any of the first to fifth aspects does not regulate movement of the recording section in the second direction when the regulating unit is in the regulating state.

According to the present aspect, since the configuration is such that the regulating unit does not regulate movement of the recording section in the second direction when the regulating unit is in the regulating state; that is, the configuration is such that the regulating unit regulates movement of the recording section in only the first direction when the regulating unit is in the regulating state, it is possible to simplify the configuration of the regulating unit compared with a configuration of regulating movement in both the first direction and the second direction.

According to a seventh aspect, the recording section of the fifth or sixth aspect is configured to move to a third position even further than the second position in the first direction, and when the recording section moves from the first position to the third position and when the recording section moves from the third position to the first position, the regulating unit of the fifth or sixth aspect retains the non-regulating state.

According to the present aspect, when the recording section moves from the first position to the third position and when the recording section moves from the third position to the first position, the regulating unit retains the non-regulating state, and therefore, when the recording section frequently moves between the first position and the third position, the recording section is able to move smoothly without being hindered by the regulating unit.

Note that the recording section may be configured to move to the third position further than the second position in the second direction, and when the recording section moves from the first position to the third position and when the recording section moves from the third position to the first position, the regulating unit may retain the non-regulating state.

According to an eighth aspect, the recording section of the seventh aspect includes a contact section that is configured to come into contact with the regulating unit and a regulated section that is a portion, movement of which in the first direction is regulated at the second position, the regulating unit of the seventh aspect includes a lock section that is reciprocated with respect to a movement region of the regulated section by rotating and a cam that is a member for switching a posture of the lock section by rotating, that includes a supporting section which is configured to support the lock section and a first portion and a second portion which are configured to come into contact with the contact section, and that is rotated by the contact section in accordance with the moving operation of the recording section, the lock section is configured to switch between a first posture in which the lock section is advanced to the movement region of the regulated section to form the regulating state and a second posture in which the lock section is separated from the movement region of the regulated section to form the non-regulating state, the cam is configured to rotate to switch between a first rotational phase in which the supporting section supports the lock section such that the lock section takes the second posture and a second rotational phase in which the supporting section terminates supporting of the lock section to enable the lock section to be switched from the second posture to the first posture, when the recording section moves in the first direction even further than the third position in a state in which the cam has the first rotational phase, the contact section comes into contact with the first portion such that the cam is rotated so as to have the second rotational phase, and the lock section taking the second posture thereby rotates to be mounted on an upper surface of the regulated section, when the recording section moves in the second direction in a state in which the lock section is mounted on the upper surface of the regulated section, the lock section drops from the upper surface of the regulated section to be switched to the first posture, and when the recording section moves in the second direction in a state in which the cam has the second rotational phase and in which the lock section takes the first posture, the contact section comes into contact with the second portion to rotate the cam such that the cam has the first rotational phase.

According to the present aspect, the regulating unit which is able to switch the posture of the lock section upon rotation of the cam and the state of which is switched in accordance with the moving operation of the recording section is able to be formed with a small number of components while suppressing a size increase.

According to a ninth aspect, the second portion of the cam of the eighth aspect includes a cam surface that is configured to come into contact with the contact section of the recording section that moves in the first direction from the first position in a state in which the cam has the second rotational phase, and when the recording section moves in the first direction in a state in which the contact section is in contact with the cam surface, the cam rotates so as to have the first rotational phase.

The regulating unit is configured to be switched from the non-regulating state to the regulating state when the recording section moves even further than the third position in the first direction and then moves in the second direction. However, in an instance in which the regulating unit has already been switched to the regulating state due to any irregular event, such as vibration or impact, when the recording section is to move from the first position to the third position, the recording section is not able to move to the third position.

In view of such a problem, according to the present aspect, the configuration is such that the cam surface is provided in the second portion of the cam and such that, when the recording section moves in the first direction in the state in which the contact section is in contact with the cam surface, the cam rotates so as to have the first rotational phase. Accordingly, even in an instance in which the regulating unit has been switched to the regulating state when the recording section is to move from the first position to the third position, the regulating unit is able to return its state to the non-regulating state, and the recording section is able to move to the third position.

According to a tenth aspect, the lock section of the eighth or ninth aspect includes a holder member that is configured to rotate, a sliding member that is held by the holder member and that is configured to come into contact with the regulated section and configured to slide with respect to the holder member in a direction including a movement direction component of the regulated section, and a pressing member that is held by the holder member and presses the sliding member in a direction in which the sliding member is pressed against the regulated section, and a pressing force of the pressing member for pressing the sliding member is set to such a magnitude that a position of the sliding member with respect to the holder member is retained when the wiper wipes the liquid ejection surface.

According to the present aspect, since the lock section includes the holder member, the sliding member, and the pressing member, when the recording section is driven in the first direction by a force opposing the pressing force of the pressing member, it is possible to move the recording section to some extent in a slidable range of the sliding member. As a result, it is possible to finely adjust the relative positions of the wiper and the liquid ejection surface and appropriately wipe the liquid ejection surface.

Since the pressing force of the pressing member for pressing the sliding member is set to such a magnitude that the position of the sliding member with respect to the holder member is retained when the wiper wipes the liquid ejection surface, it is possible to suppress the recording section from moving in the direction away from the wiper when the wiper wipes the liquid ejection surface, and it is possible to appropriately wipe the liquid ejection surface.

According to an eleventh aspect, a motor corresponding to a power source of the moving unit of the tenth aspect; and a control unit that controls the motor are further included, in which the control unit moves the recording section in the first direction to separate the liquid ejection surface from the wiper before the wiper separates from the liquid ejection surface after the wiper completes wiping of the liquid ejection surface.

In an instance in which the wiper moves and then separates from the liquid ejection surface in a state in which the wiper is deformed by being pressed against the liquid ejection surface, when the wiper returns to an original shape due to elasticity, liquid adhering to the wiper may be scattered. However, according to the present aspect, since the control unit moves the recording section in the first direction to separate the liquid ejection surface from the wiper before the wiper separates from the liquid ejection surface after the wiper completes wiping of the liquid ejection surface, it is possible to suppress the problem of scattering liquid described above.

Hereinafter, the disclosure will be specifically described.

An ink jet printer 1 that performs recording by ejecting ink, which is an example of a liquid, onto a medium such as a recording sheet will be described below as an example of a recording apparatus. Hereinafter, the ink jet printer 1 is abbreviated as "printer 1".

Note that the X-Y-Z coordinate system illustrated in each drawing is an orthogonal coordinate system. The Y-axis direction is a direction intersecting a transport direction of a medium, that is, a medium-width direction, and an apparatus depth direction. In the Y-axis direction, the +Y direction is a direction from the front of the apparatus to the rear of the apparatus, and the −Y direction is a direction from the rear of the apparatus to the front of the apparatus. In the present embodiment, the Y-axis direction is an example of a width direction intersecting the V-axis direction, which is a movement direction of a head unit 50 described later.

The X-axis direction is an apparatus width direction, and when viewed from the position of an operator of the printer 1, the +X direction is the left side, and the −X direction is the right side. The Z-axis direction is the vertical direction and a direction normal to a mounting surface G, that is, an apparatus height direction. In the Z-axis direction, the +Z direction is the up direction, and the −Z direction is the down direction.

In the following description, a direction in which a medium is transported may be referred to as "downstream", and a direction opposite thereto may be referred to as "upstream". In each drawing, a medium-transport path is indicated by a broken line. In the printer 1, the medium is transported on the medium-transport path indicated by the broken line.

The F-axis direction is a medium-transport direction between a line head 51 and a transport belt 13 described later, that is, a medium-transport direction in a recording region, the +F direction is downstream in the transport direction, and the −F direction opposite thereto is upstream in the transport direction. The V-axis direction is a direction orthogonal to the F-axis direction and is a movement direction of the head unit 50, which is an example of a recording section described later. In the V-axis direction, the +V direction is an example of a first direction in which the head unit 50 retreats from a recording-time transport path T1, and the −V direction is an example of a second direction in which the head unit 50 advances to the recording-time transport path T1. In the present embodiment, the V-axis direction is also a direction extending along an inclination of a discharge tray 8 described later.

The medium-transport path in the printer 1 will be described below with reference to FIG. 1. The printer 1 is configured such that an additional unit 6 is able to be coupled to a lower portion of an apparatus main body 2, and FIG. 2 illustrates a state in which the additional unit 6 is coupled.

A first media cassette 3 that stores a medium is provided in a lower portion of the apparatus main body 2, and when the additional unit 6 is coupled, a second media cassette 4 and a third media cassette 5 are further provided below the first media cassette 3.

Each of the media cassettes includes a pick-up roller for feeding a stored medium in the −X direction. Pick-up rollers 21, 22, and 23 are provided for the first media cassette 3, the second media cassette 4, and the third media cassette 5, respectively.

Each of the media cassettes includes a feeding roller pair for feeding the medium, which is fed in the −X direction, in an obliquely upward direction. Feeding roller pairs 25, 26, and 27 are provided for the first media cassette 3, the second media cassette 4, and the third media cassette 5, respectively.

Note that, unless otherwise stated, a roller pair below is constituted by a driving roller driven by a motor (not illustrated) and a driven roller rotationally driven by being in contact with the driving roller.

The medium fed from the third media cassette 5 is transported to a transport roller pair 38 by transport roller pairs 29 and 28. The medium fed from the second media cassette 4 is transported to the transport roller pair 38 by the transport roller pair 28. The medium is nipped by the transport roller pair 38 and transported to a transport roller pair 31.

The medium fed from the first media cassette 3 is transported to the transport roller pair 31 without passing through the transport roller pair 38.

Figure 2:
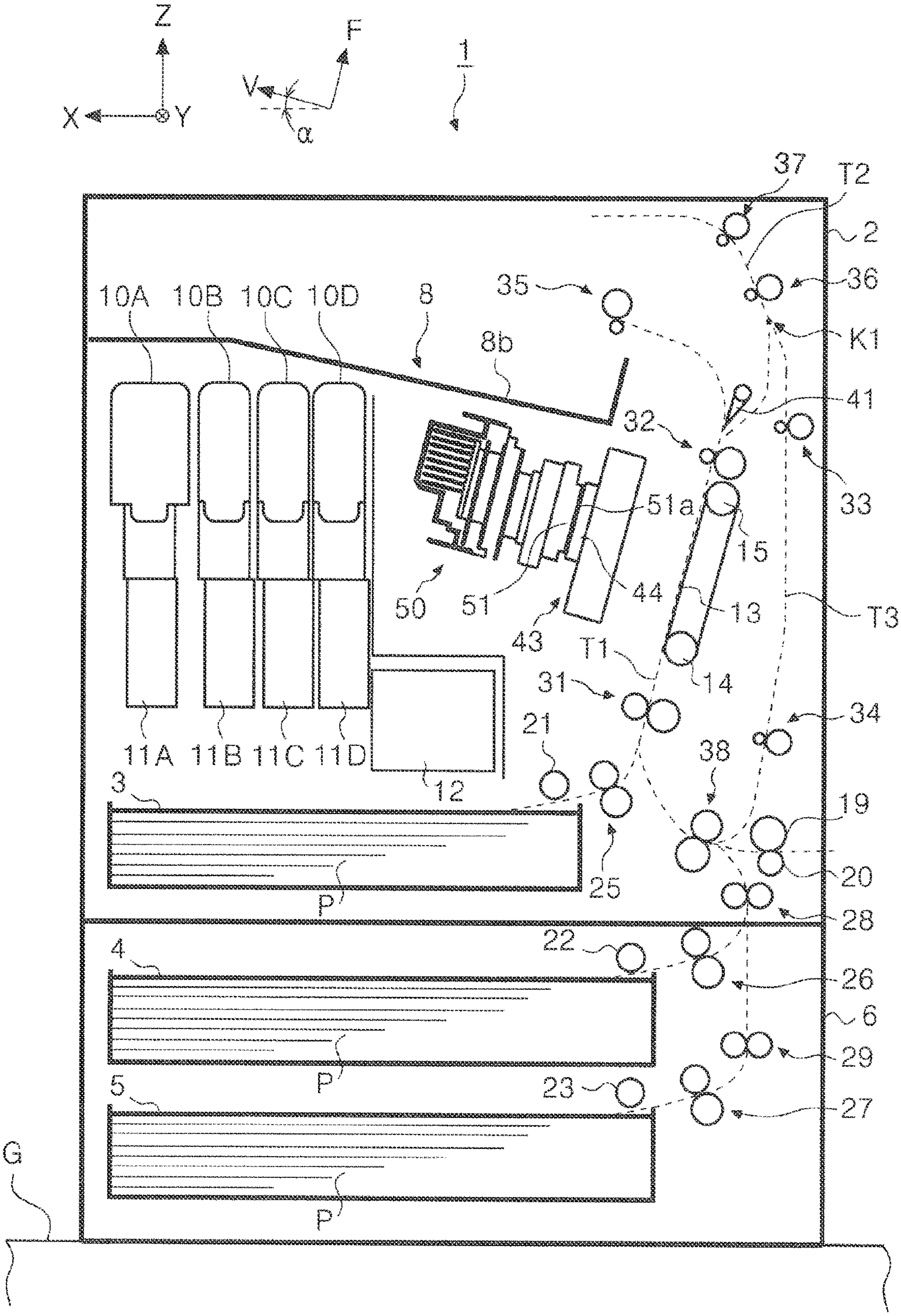
FIG. 2 illustrates the medium-transport path of the printer and a state in which the head unit is at a second position.

Note that a supply roller 19 and a separation roller 20 which are provided near the transport roller pair 38 correspond to a roller pair for feeding a medium from a supply tray, which is not illustrated in FIG. 1.

The medium that is subjected to a feeding force from the transport roller pair 31 is transported to a position between the line head 51, which is an example of a liquid ejecting head, and the transport belt 13, that is, a recording position facing the line head 51. Note that, in the following description, a medium-transport path from the transport roller pair 31 to a transport roller pair 32 is referred to as the recording-time transport path T1.

The head unit 50 is constituted by the line head 51. The line head 51 performs recording by ejecting ink, which is an example of a liquid, onto a surface of a medium. The line head 51 corresponds to an ink ejecting head which is configured such that nozzles for ejecting the ink cover the entire region of the medium in the width direction and which is able to perform recording on the entire region of the medium in the width direction without moving in the medium-width direction. However, the ink ejecting head is not limited thereto and may be a type for ejecting the ink while moving in the medium-width direction in a state of being mounted on a carriage.

The head unit 50 is provided to be able to be reciprocated with respect to the recording-time transport path T1 and to be able to move between a position at which the head unit 50 is most advanced to the recording-time transport path T1 and a position at which the head unit 50 is most retreated from the recording-time transport path T1. In FIG. 1, the head unit 50 is at the position at which the head unit 50 is most advanced to the recording-time transport path T1, and recording is performed on the medium in this state. The head unit 50 illustrated in FIG. 2 is at a position at which an ink ejection surface 51*a* of the line head 51 is wiped, and details of an operation of wiping the ink ejection surface 51*a* will be described later.

Ink storage sections 10A, 10B, 10C, and 10D are liquid storage sections. The ink ejected from the line head 51 is supplied from each of the ink storage sections to the line head 51 via a tube (not illustrated). The ink storage sections 10A, 10B, 10C, and 10D are provided to be detachably attached to attachment sections 11A, 11B, 11C, and 11D, respectively.

Ink corresponding to waste liquid ejected from the line head 51 onto a flushing cap (not illustrated) for maintenance is accommodated in a waste-liquid storage section 12.

The transport belt 13 is an endless belt wound around a pulley 14 and a pulley 15 and rotates when at least one of the pulley 14 and the pulley 15 is driven by a motor (not illustrated). The medium is transported through a position facing the line head 51 while the medium adheres to a belt surface of the transport belt 13. A known adhesion method such as an air suction method or an electrostatic adhesion method can be used to cause the medium to adhere to the transport belt 13.

Here, the recording-time transport path T1 passing through the position facing the line head 51 is configured to intersect both the horizontal direction and the vertical direction and to transport the medium upward. Thus, the V-axis direction, which is the movement direction of the head unit 50, also intersects both the horizontal direction and the vertical direction, and an inclination angle $\alpha$ of the V-axis direction with respect to the horizontal direction is smaller than 45°, more specifically, is substantially 15°.

According to such a configuration, it is possible to balance the space in the horizontal direction and in the vertical direction for movement of the head unit 50, and it is possible to suppress an excessive size increase of the apparatus in the horizontal direction and the vertical direction.

Note that the configuration is not limited thereto, and the V-axis direction may be parallel to the horizontal direction or the vertical direction.

The discharge tray 8 which is provided in the +Z direction with respect to the head unit 50 and forms a supporting surface 8*b* for supporting a medium discharged from the medium-transport path is provided such that the supporting surface 8*b* extends in the V-axis direction, which is the movement direction of the head unit 50. As a result, no unnecessary space is formed between the discharge tray 8 and a movement region of the head unit 50, thus making it possible to suppress a size increase of the apparatus.

Since part of the head unit 50 overlaps the ink storage sections 10A and 10B serving as the liquid storage sections in the Z-axis direction, it is possible to suppress a size increase of the apparatus in the Z-axis direction.

After recording has been performed on a first surface of the medium by the line head 51, the medium is transported further upward by the transport roller pair 32 positioned downstream of the transport belt 13.

A flap 41 is provided downstream of the transport roller pair 32 and switches the transport direction of the medium. When the medium is directly discharged, the transport path of the medium is switched by the flap 41 so as to be directed to a transport roller pair 35 provided above the flap 41, and the medium is discharged to the discharge tray 8 by the transport roller pair 35.

When recording is further performed on a second surface of the medium in addition to the first surface, the transport direction of the medium is directed to a branch position K1 by the flap 41. The medium then passes through the branch position K1 and enters a switch-back path T2. In the present embodiment, the switch-back path T2 is a medium-transport path extending upward from the branch position K1. Transport roller pairs 36 and 37 are provided on the switch-back path T2. The medium that has entered the switch-back path T2 is transported upward by the transport roller pairs 36 and 37. When a lower edge of the medium passes through the branch position K1, the rotational direction of the transport roller pairs 36 and 37 is switched to thereby transport the medium downward.

An inverting path T3 is coupled to the switch-back path T2. In the present embodiment, the inverting path T3 is a medium-transport path that starts from the branch position K1, passes through transport roller pairs 33 and 34, and terminates at the transport roller pair 38.

The medium transported downward from the branch position K1 is caused to arrive at the transport roller pair 38 by being subjected to a feeding force from the transport roller pairs 33 and 34 and is flexed and inverted to be transported to the transport roller pair 31.

When the medium is fed again to the position at which the medium faces the line head 51, the second surface faces the line head 51, the second surface being opposite to the first surface on which recording has already been performed. Thus, the second surface of the medium becomes ready for recording performed by the line head 51.

Next, a moving unit that moves the head unit 50 in the V-axis direction will be described with reference to FIGS. 3 to 8. Note that FIGS. 3 and 4 do not illustrate a first member 61 illustrated in FIGS. 5 and 6 but clearly illustrate a side surface of the head unit 50.

In FIGS. 3 to 6, a moving unit 60 includes the first member 61, a second rack forming member 62, a second member 63, a third rack forming member 64, a first pinion gear 65, and a second pinion gear 67.

In the present embodiment, the moving unit 60 is provided in each side of the head unit 50 in the Y-axis direction intersecting the V-axis direction.

Figure 7:
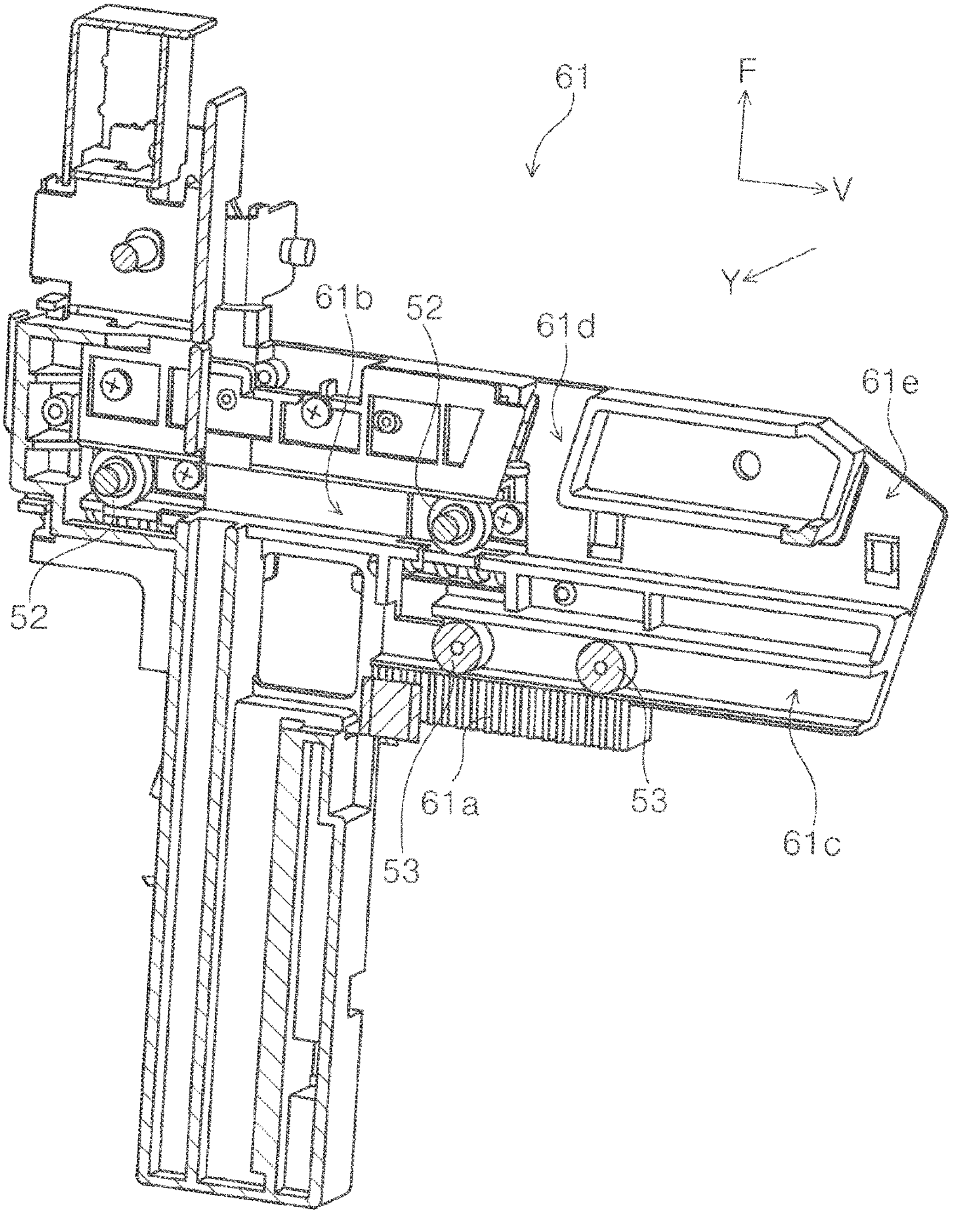
FIG. 7 is a sectional perspective view of part of a first member and the head unit when the head unit is at the first position.
Figure 8:
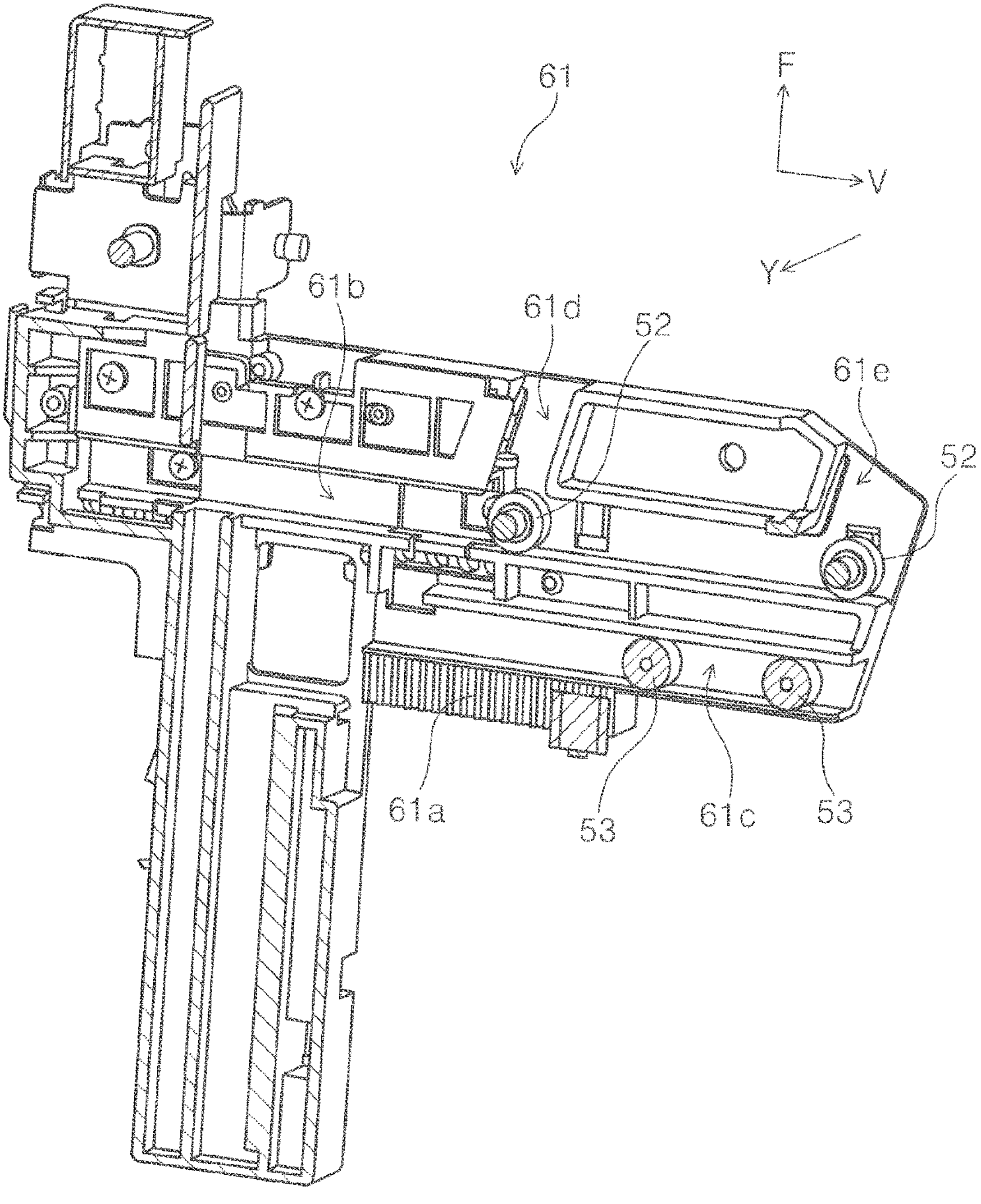
FIG. 8 is a sectional perspective view of part of the first member and the head unit when the head unit is at the second position.

The first member 61 is provided so as to be fixed to a frame (not illustrated) of the apparatus at a position at which the first member 61 faces the Y-axis direction side surface of the head unit 50, and a first rack 61*a* is formed so as to extend in the V-axis direction on a side of the first member 61 which faces the head unit 50. As illustrated in FIGS. 7 and 8, a first guide groove 61*b* and a second guide groove 61*c* that extend in the V-axis direction are formed in the first member 61.

Figure 3:
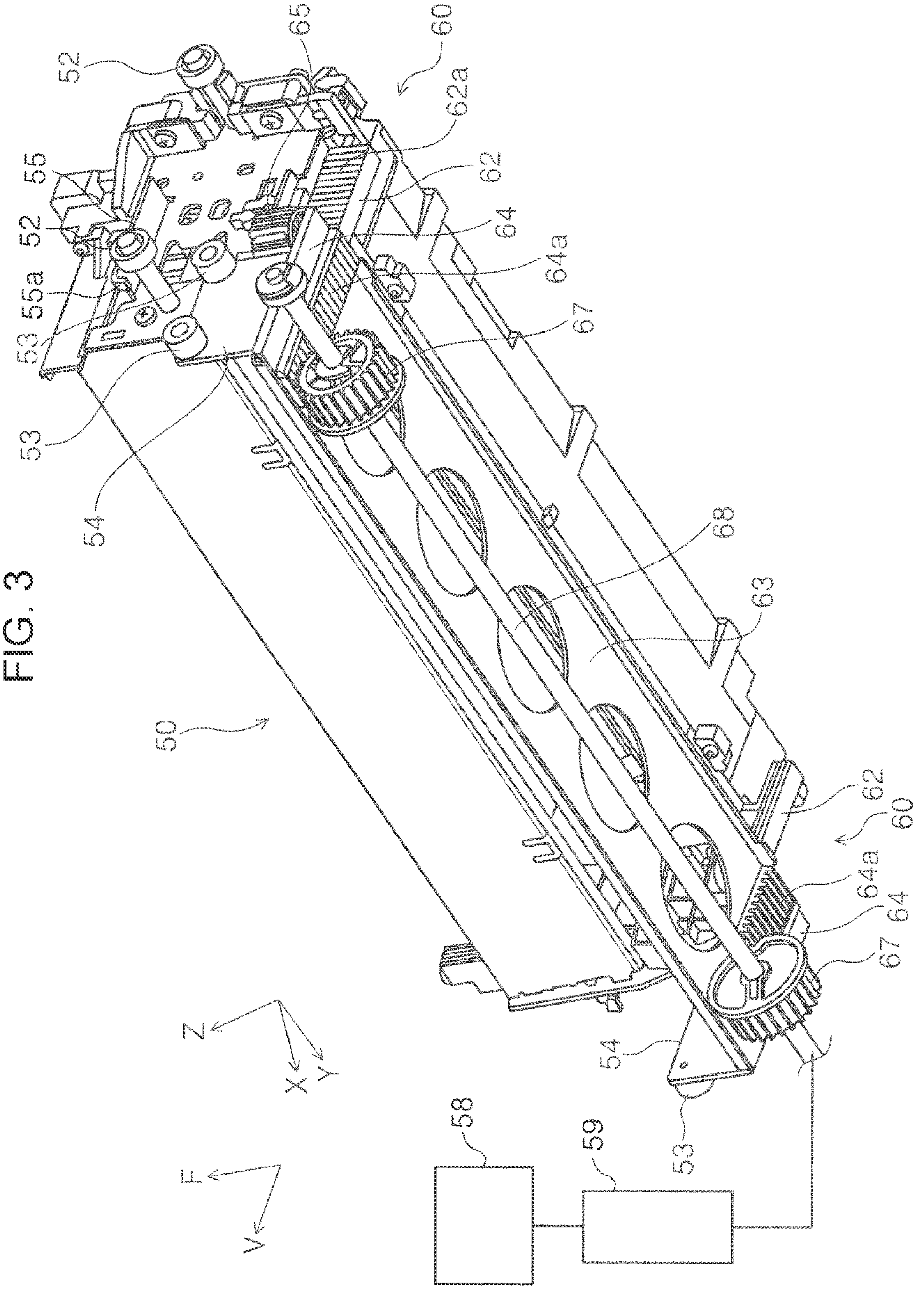
FIG. 3 is a perspective view of the head unit and a moving unit and illustrates the state in which the head unit is at the first position.
Figure 4:
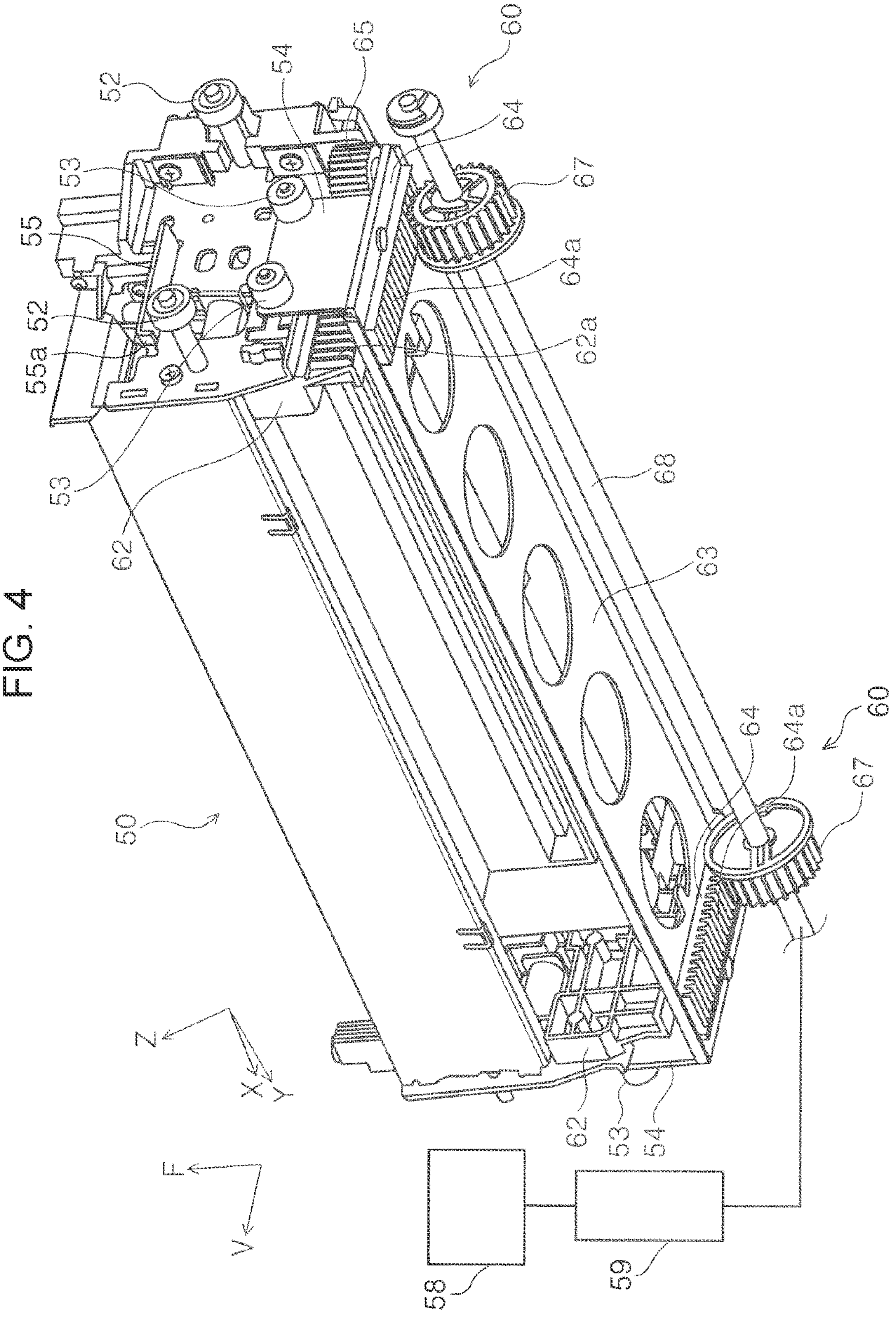
FIG. 4 is a perspective view of the head unit and the moving unit and illustrates the state in which the head unit is at the second position.

As illustrated in FIGS. 3 and 4, two upper rollers 52 are provided on the Y-axis direction side surface of the head unit 50, that is, the side surface facing the first member 61, with a gap therebetween in the V-axis direction. As illustrated in FIGS. 7 and 8, the two upper rollers 52 fit into the first guide groove 61*b* of the first member 61 such that the head unit 50 is guided by the first member 61 in the V-axis direction. Rotation of the upper rollers 52 reduces sliding resistance when the head unit 50 moves.

Figure 5:
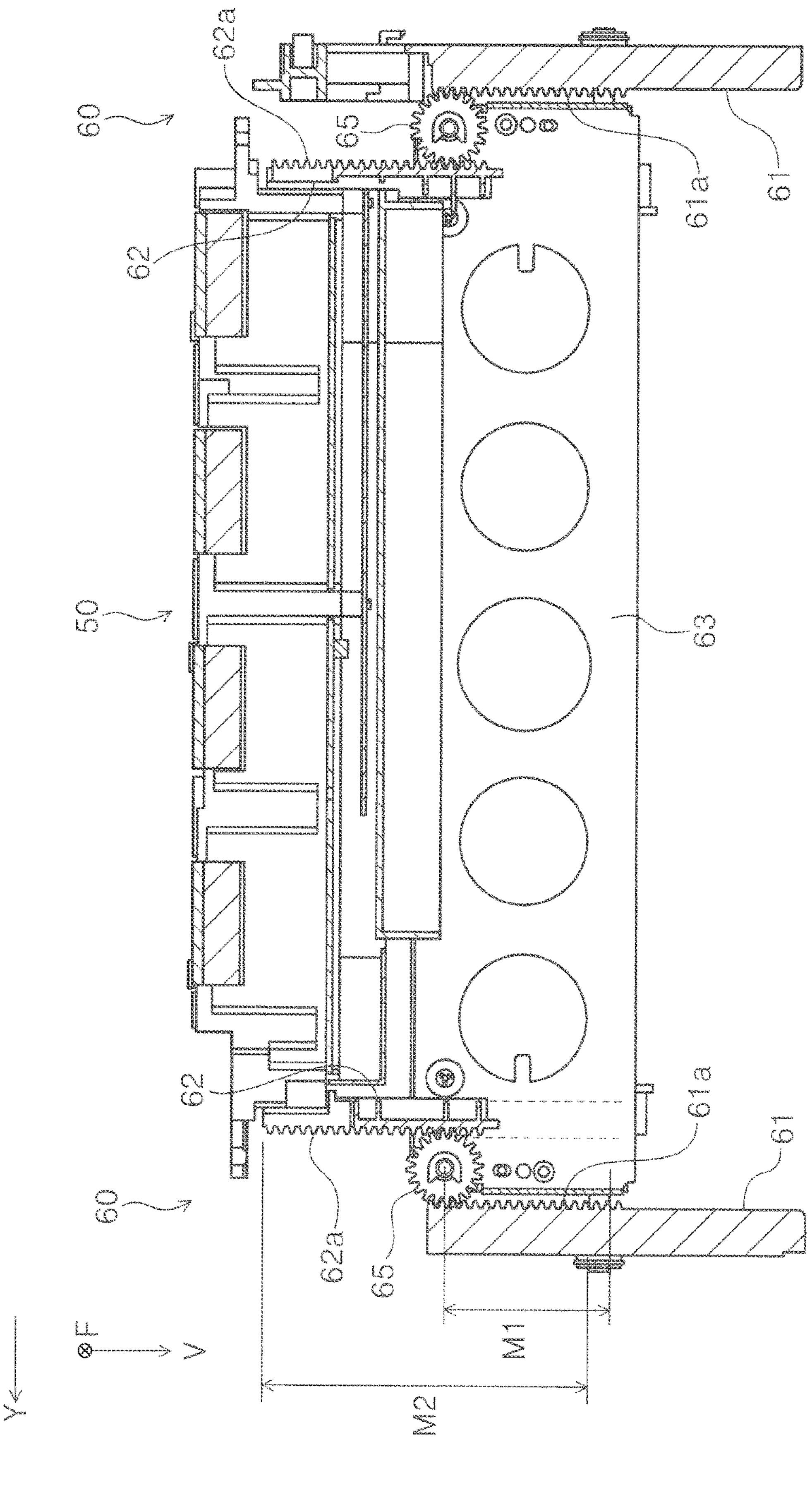
FIG. 5 is a sectional view of the head unit and the moving unit and illustrates the state in which the head unit is at the first position.
Figure 6:
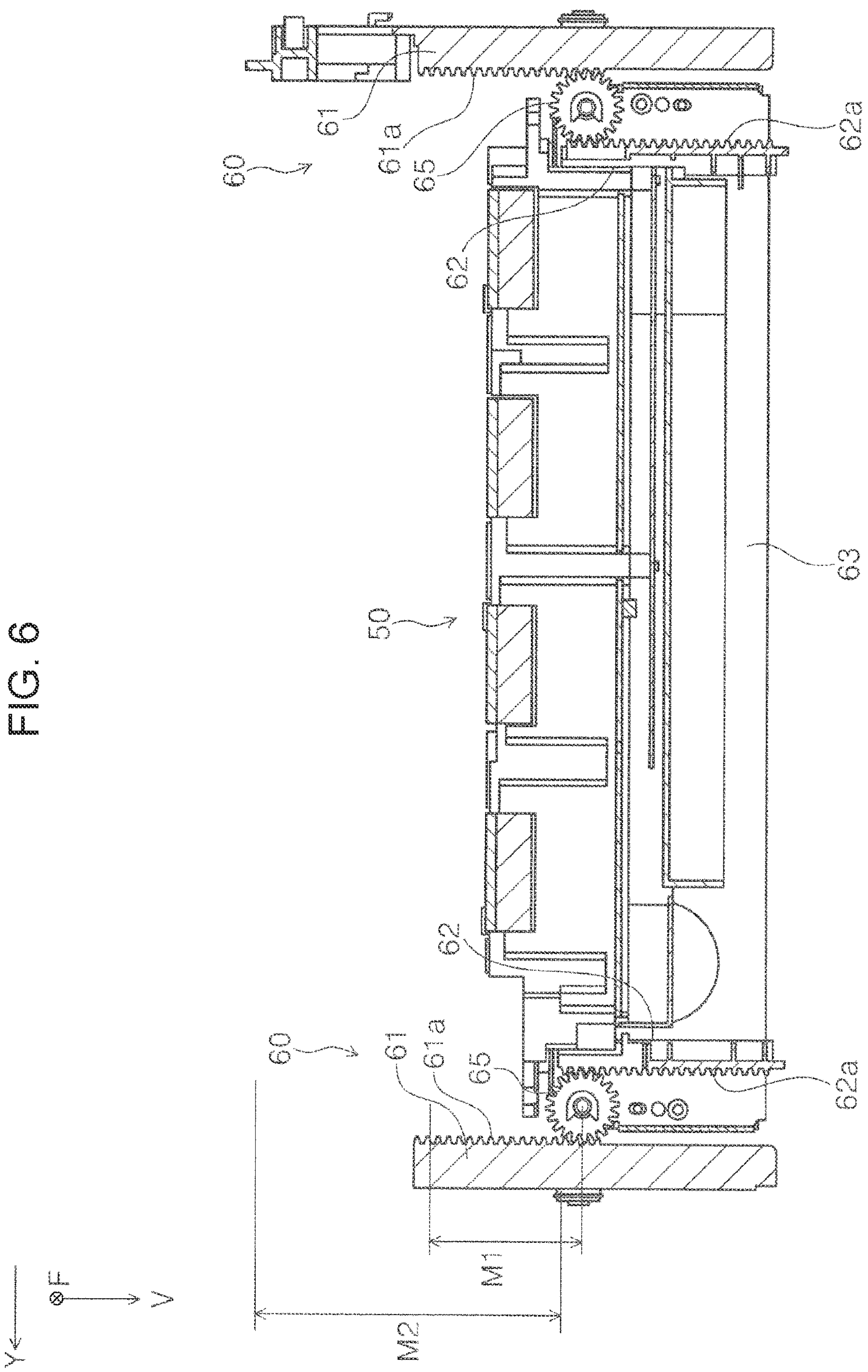
FIG. 6 is a sectional view of the head unit and the moving unit and illustrates the state in which the head unit is at the second position.

Next, the second rack forming member 62 is provided in the Y-axis direction end of the head unit 50, and a second rack 62*a* is formed in the second rack forming member 62 so as to extend in the V-axis direction. As illustrated in FIGS. 5 and 6, the first rack 61*a* and the second rack 62*a* face each other, the first pinion gear 65 is disposed between the first rack 61*a* and the second rack 62*a*, and the first pinion gear 65 engages both the first rack 61*a* and the second rack 62*a*.

The first pinion gear 65 is rotatably provided in the second member 63. As illustrated in FIGS. 3 and 4, two lower rollers 53 are provided on the Y-axis direction side surface of the second member 63 with a gap therebetween in the Y-axis direction. The lower rollers 53 are supported by a lower-roller supporting member 54 fixed to the second member 63.

The two lower rollers 53 fit into the second guide groove 61*c* (refer to FIGS. 7 and 8) of the first member 61 such that the second member 63 is guided by the first member 61 in the V-axis direction. Rotation of the lower rollers 53 reduces sliding resistance when the second member 63 moves.

As illustrated in FIGS. 3 and 4, the third rack forming member 64 is provided on the lower side of the second member 63, and a third rack 64*a* is formed in the third rack forming member 64 so as to extend in the V-axis direction. The second pinion gear 67 engages the third rack 64*a*. Note that the third rack forming member 64 is provided in each Y-axis direction end on the lower side of the second member 63. The second pinion gear 67 is provided at each position facing the third rack 64*a* on a rotational shaft 68 rotating about an axis parallel to the Y-axis direction, and the configuration is such that two second pinion gears 67 rotate at the same time upon rotation of the rotational shaft 68. Note that power of a motor 59 is transferred to the rotational shaft 68 via a gear mechanism, which is not illustrated in FIG. 3 or 4.

Note that a control section 58 controls the motor 59. The control section 58 is able to identify a position of the head unit 50 in the V-axis direction in accordance with a signal received from a reference-position sensor (not illustrated) and a driving amount of the motor 59. Note that, in an instance in which no reference-position sensor (not illustrated) is provided, when the head unit 50 arrives at the +V direction end or the −V direction end in a movable range, a current value of the motor 59 increases, and it is thus possible to identify a position of the head unit 50 in the V-axis direction by detecting the increase in the current value.

According to the foregoing configuration, when the second pinion gear 67 rotates, the second member 63 moves in the V-axis direction. Here, since the first member 61, that is, the first rack 61*a*, is provided in a fixed manner, the first pinion gear 65 provided in the second member 63 that moves in the V-axis direction rotates in accordance with engagement with the first rack 61*a*.

Since the first pinion gear 65 engages the second rack 62*a* provided in the head unit 50, the head unit 50 moves so as to be pushed in the V-axis direction upon rotation of the first pinion gear 65.

For example, when the second member 63 moves in the +V direction in a state in which the head unit 50 is at the position illustrated in FIG. 5, the first pinion gear 65 on the right side in FIG. 5 rotates counterclockwise in FIG. 5, and the first pinion gear 65 on the left side in FIG. 5 rotates clockwise in FIG. 5. As a result, the head unit 50 is moved in the +V direction.

When the second member 63 moves in the −V direction in a state in which the head unit 50 is at the position illustrated in FIG. 6, the first pinion gear 65 on the right side in FIG. 6 rotates clockwise in FIG. 6, and the first pinion gear 65 on the left side in FIG. 6 rotates counterclockwise in FIG. 6. As a result, the head unit 50 is moved in the −V direction.

Here, range M1 in the V-axis direction in FIGS. 5 and 6 is a movement range of the second member 63 based on the rotational shaft center of the first pinion gear 65. Range M2 in the V-axis direction in FIGS. 5 and 6 is a movement range of the head unit 50 based on a position of the −V direction end of the second rack forming member 62.

Since the head unit 50 moves in the V-axis direction upon rotation of the first pinion gear 65 as described above, and the first pinion gear 65 itself is also configured to move in the V-axis direction, range M2 of movement of the head unit 50 is larger than range M1 of movement of the second member 63. In the present embodiment, a size of range M2 of movement is substantially twice that of range M1 of movement.

As described above, the moving unit 60 causes the motor 59 to move the head unit 50 in the V-axis direction, the head unit 50 being movable between a position at which the head unit 50 is advanced to the transport path for transporting the medium and performs recording on the transported medium and a position at which the head unit 50 is retreated from the transport path. The moving unit 60 includes: the first member 61 in which the first rack 61*a* is formed in the movement direction of the head unit 50; the first pinion gear 65 that engages the first rack 61*a*; the second rack 62*a* that is provided in the head unit 50 at a position facing the first rack 61*a*, that is formed so as to extend in the V-axis direction, which is the movement direction of the head unit 50, and that engages the first pinion gear 65; and the second member 63 in which the first pinion gear 65 is rotatably provided and which is able to be moved in the V-axis direction by the motor 59. Due to rotation of the first pinion gear 65 that moves in the V-axis direction, a movement amount of the head unit 50 is larger than a movement amount of the second member 63. In other words, since it is possible to ensure the movement amount of the head unit 50 while suppressing the movement amount of the second member 63, it is possible to suppress a size increase of a mechanism for moving the second member 63, specifically, suppress a dimension of the third rack 64*a* in the V-axis direction in the present embodiment. As a result, it is possible to suppress a size increase of the printer 1.

Note that, although the first member 61 in which the first rack 61*a* is formed is provided so as to be fixed to the frame (not illustrated) of the apparatus in the present embodiment, the first member 61 may be provided so as to be movable in the V-axis direction, and a rack-and-pinion mechanism for moving the first member 61 in the V-axis direction may be additionally provided. This makes it possible to further increase the movement region of the head unit 50.

It is also suitable that the first pinion gear 65 have a two-stage gear of a main gear and a sub-gear. More specifically, in a state in which the number of teeth of the sub-gear is set to be larger than the number of teeth of the main gear, the main gear engages the first rack 61*a*, and the sub-gear engages the second rack 62*a*. According to such a configuration, it is possible to further increase the movement amount of the second rack 62*a* with respect to rotation of the first pinion gear 65 and further increase the movement region of the head unit 50.

In the present embodiment, since the second rack 62*a* is provided on the side surface of the head unit 50 in the Y-axis direction intersecting the V-axis direction, it is possible to reduce a size of the head unit 50 including the second rack 62*a* when viewed from the Y-axis direction side.

Since the moving unit 60 is provided in each side of the head unit 50 in the Y-axis direction, it is possible to equalize the movement amount of the head unit 50 in the V-axis direction between one end side and the other end side in the Y-axis direction. As a result, it is possible to move the head unit 50 in the V-axis direction while appropriately retaining the posture of the head unit 50.

Next, the head unit 50 is configured to be detachably attached to the apparatus main body 2 including the first member 61 and the second member 63. In FIGS. 7 and 8, a third guide groove 61*d* and a fourth guide groove 61*e* are formed in the first member 61, and the configuration is such that the upper rollers 52 and 52 provided on the Y-axis direction side surface of the head unit 50 are able to separate from the first guide groove 61*b* upward by passing through the third guide groove 61*d* and the fourth guide groove 61*e*. That is, the configuration is such that the head unit 50 is detachable from the first member 61. When the head unit 50 is pushed into the first member 61, the upper rollers 52 and 52 are able to fit into the first guide groove 61*b*, that is, the head unit 50 is able to be attached. The third guide groove 61*d* and the fourth guide groove 61*e* function as guiding sections for guiding the head unit 50 in an attachment/detachment direction.

The head unit 50 is detachably attached to the apparatus main body 2 as described above, thus facilitating maintenance or replacement of the head unit 50.

Next, a regulating unit that regulates movement of the head unit 50 will be described.

Figure 13:
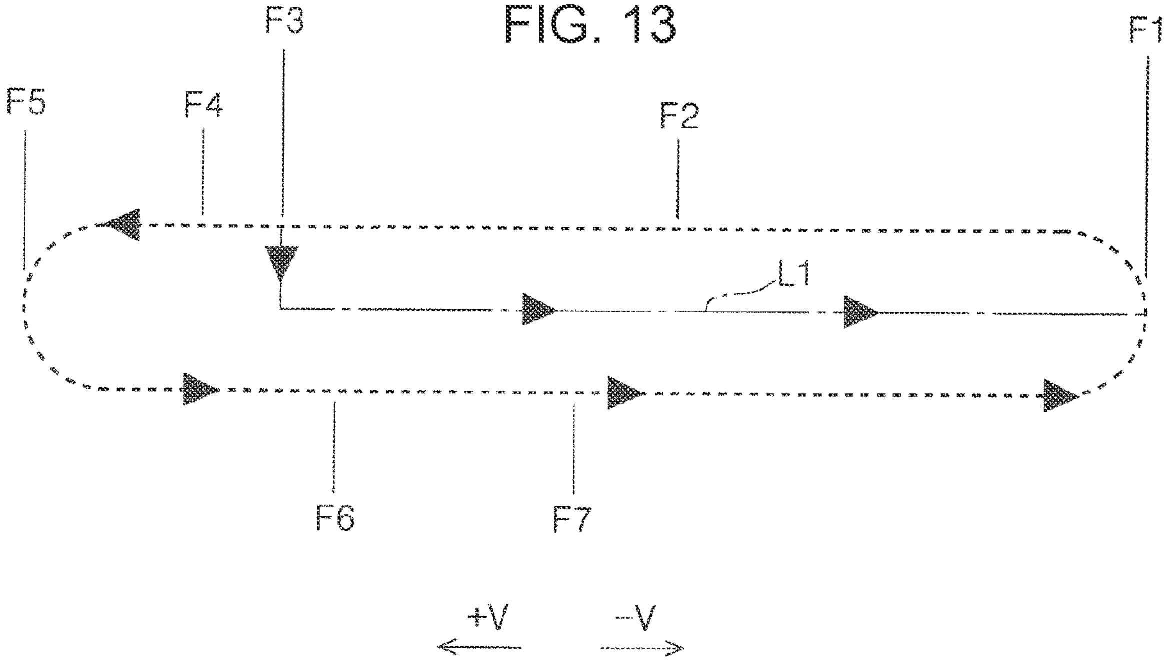
FIG. 13 schematically illustrates a movement region and each position of the head unit.

First, the movement range of the head unit 50 will be described with reference to FIG. 13. FIG. 13 schematically illustrates the movement range of the head unit 50 and, for convenience, illustrates a movement path of the head unit 50 in a loop shape. Moreover, in the following description, a position of the head unit 50 in the V-axis direction is strictly a position of a regulated surface 55*a* (refer to FIGS. 3 and 4) described later in the V-axis direction.

Position F1 in FIG. 13 is the position at which the head unit 50 is most advanced to the recording-time transport path T1, which is an example of a first position, and corresponds to the position of the head unit 50 illustrated in FIG. 1. When the head unit 50 is at position F1, recording is performed on the medium.

Position F5 in FIG. 13 is the position at which the head unit 50 is most retreated from the recording-time transport path T1. Position F3 in FIG. 13 is a position at which a flushing operation is performed for a flushing cap (not illustrated), that is, ink is ejected from all the ink ejection nozzles (not illustrated) of the line head 51 onto the flushing cap (not illustrated), which is an example of a third position. While the printer 1 performs recording on the medium, the head unit 50 periodically moves from position F1 to position F3 to perform the flushing operation. When the flushing operation ends, the head unit 50 returns from position F3 to position F1.

Position F6 is a position at which the ink ejection surface 51*a* of the line head 51 is wiped, which is an example of a second position of the head unit 50. FIG. 2 illustrates a state in which the head unit 50 is at position F6 and illustrates a wiper unit 43 that includes a wiper 44. The wiper 44 is formed of an elastic material, such as rubber or elastomer, and is able to be pressed against the ink ejection surface 51*a* due to elasticity.

The wiper unit 43 is provided so as to be able to be moved in the Y-axis direction, which is an example of a direction extending along the ink ejection surface 51*a*, by a motor (not illustrated), has a home position at the +Y direction end of a movable region, and is located at the home position excluding during wiping. Note that the control section 58 (refer to FIGS. 3 and 4) is able to identify the position of the wiper unit 43 in accordance with a detection signal from a home position sensor (not illustrated) and a driving amount of the motor (not illustrated) for driving the wiper unit 43.

When the wiper 44 wipes the ink ejection surface 51*a*, the head unit 50 moves in the +V direction from position F1 to position F5 in FIG. 13. On the other hand, after the head unit 50 moves in the +V direction to a position at which the wiper 44 is not in contact with the ink ejection surface 51*a*, the wiper unit 43 moves from the home position to the −Y direction end.

Next, the head unit 50 switches its movement direction to the +V direction to move to position F6, and when the head unit 50 has reached position F6, the wiper unit 43 moves in the +Y direction from the −Y direction end. As a result, the wiper 44 is pressed against the ink ejection surface 51*a*, and the ink ejection surface 51*a* is wiped.

Note that, strictly, the head unit 50 moves from position F5 to position F6 and, after slightly passing through position F6 in the −V direction, returns in the +V direction, and stops at position F6, which will be described later.

Positions F2, F4, and F7 in FIG. 13 will be also described later.

Next, the printer 1 includes regulating units 70A and 70B that are able to switch between a regulating state in which regulating of movement of the head unit 50 in the −V direction is performed and a non-regulating state in which the regulating is not performed and have the regulating state when the head unit 50 is at position F6, that is, the ink ejection surface 51*a* is wiped.

Figure 9:
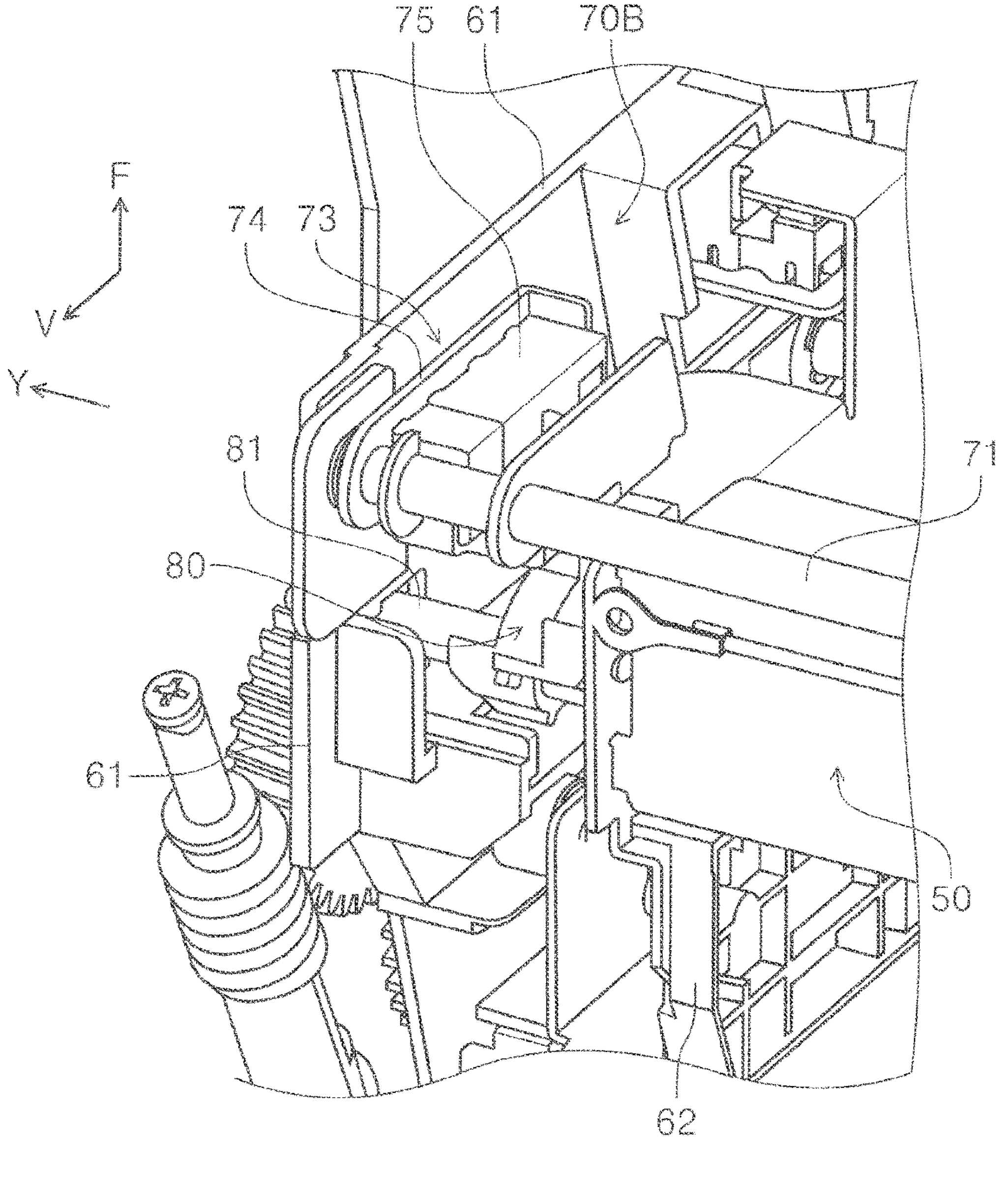
FIG. 9 is a perspective view illustrating a regulating unit provided in the +Y direction end.
Figure 10:
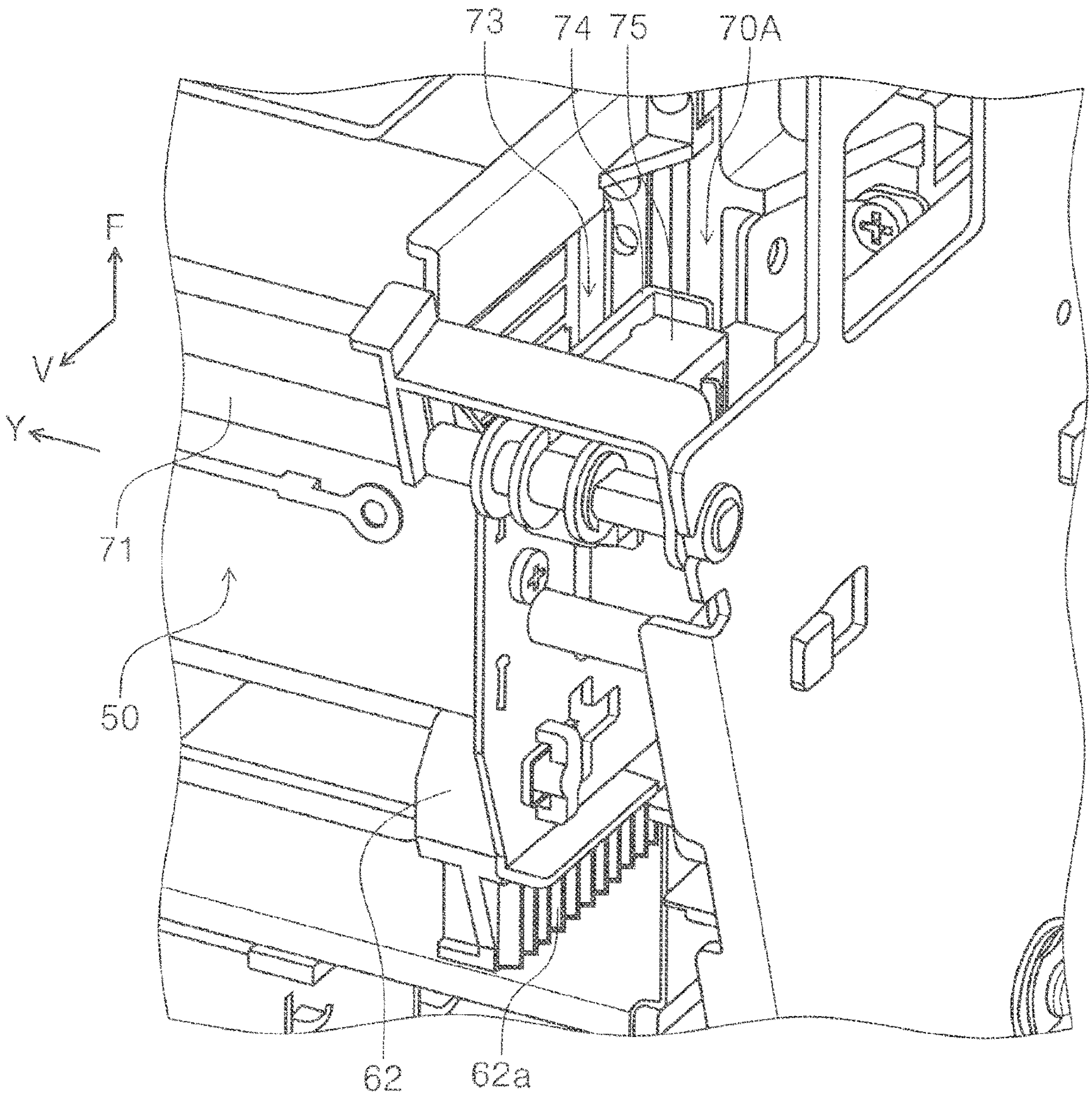
FIG. 10 is a perspective view illustrating a regulating unit provided in the −Y direction end.

The regulating unit 70A is provided in the −Y direction end with respect to the head unit 50 as illustrated in FIG. 10, and the regulating unit 70B is provided in the +Y direction end with respect to the head unit 50 as illustrated in FIG. 9. A rotational shaft 71 is provided so as to extend in the Y-axis direction and shared by the regulating unit 70B provided in the +Y direction end and the regulating unit 70A provided in the −Y direction end.

Since the regulating units 70A and 70B have a symmetrical structure in the Y-axis direction and are the same in basic configuration, the regulating unit 70A provided in the −Y direction end will be specifically described below. Note that the regulating unit is provided in the +Y direction end and the −Y direction end with respect to the head unit 50 in the present embodiment but may be provided in either end.

Figure 11:
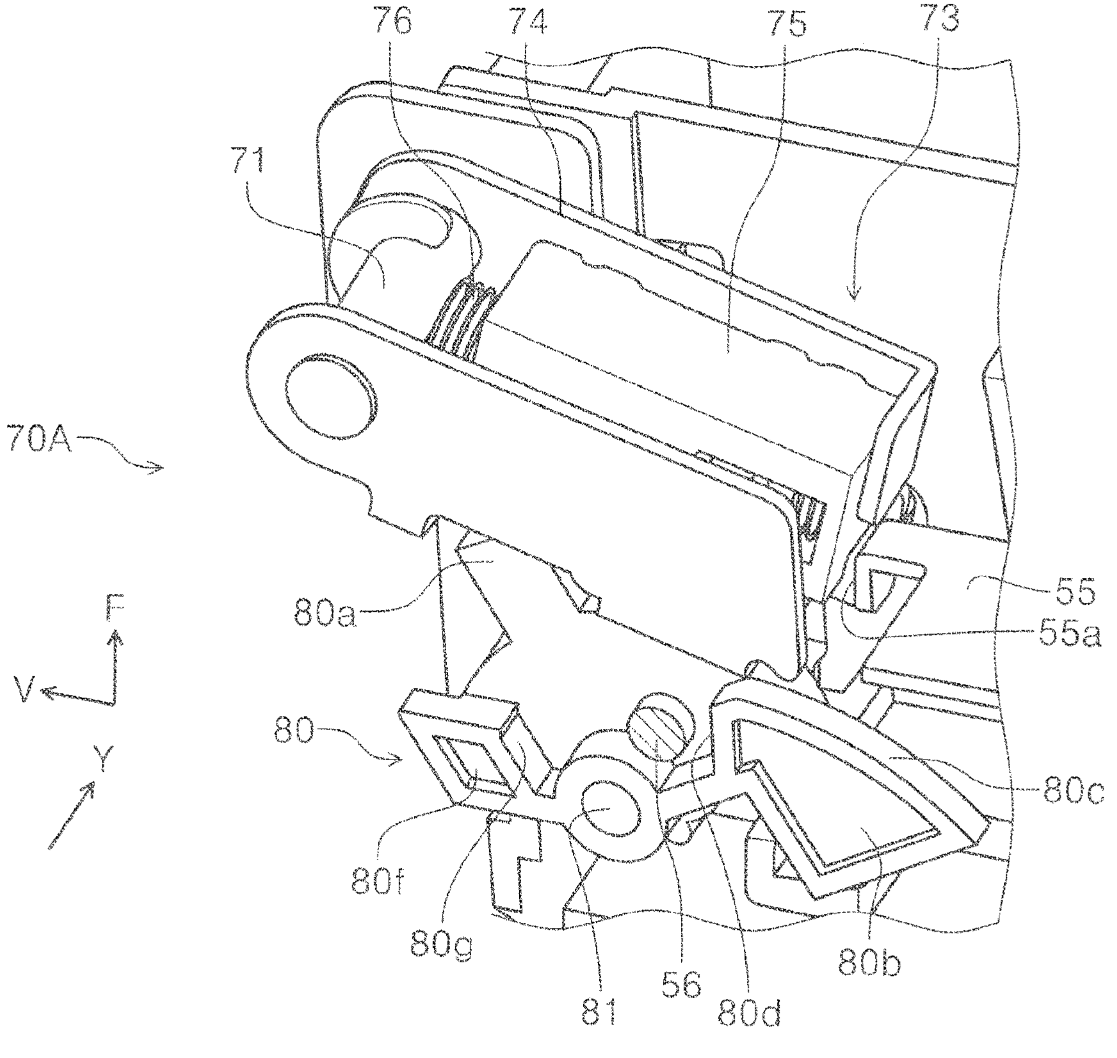
FIG. 11 is a perspective view illustrating the regulating unit provided in the −Y direction end.
Figure 12:
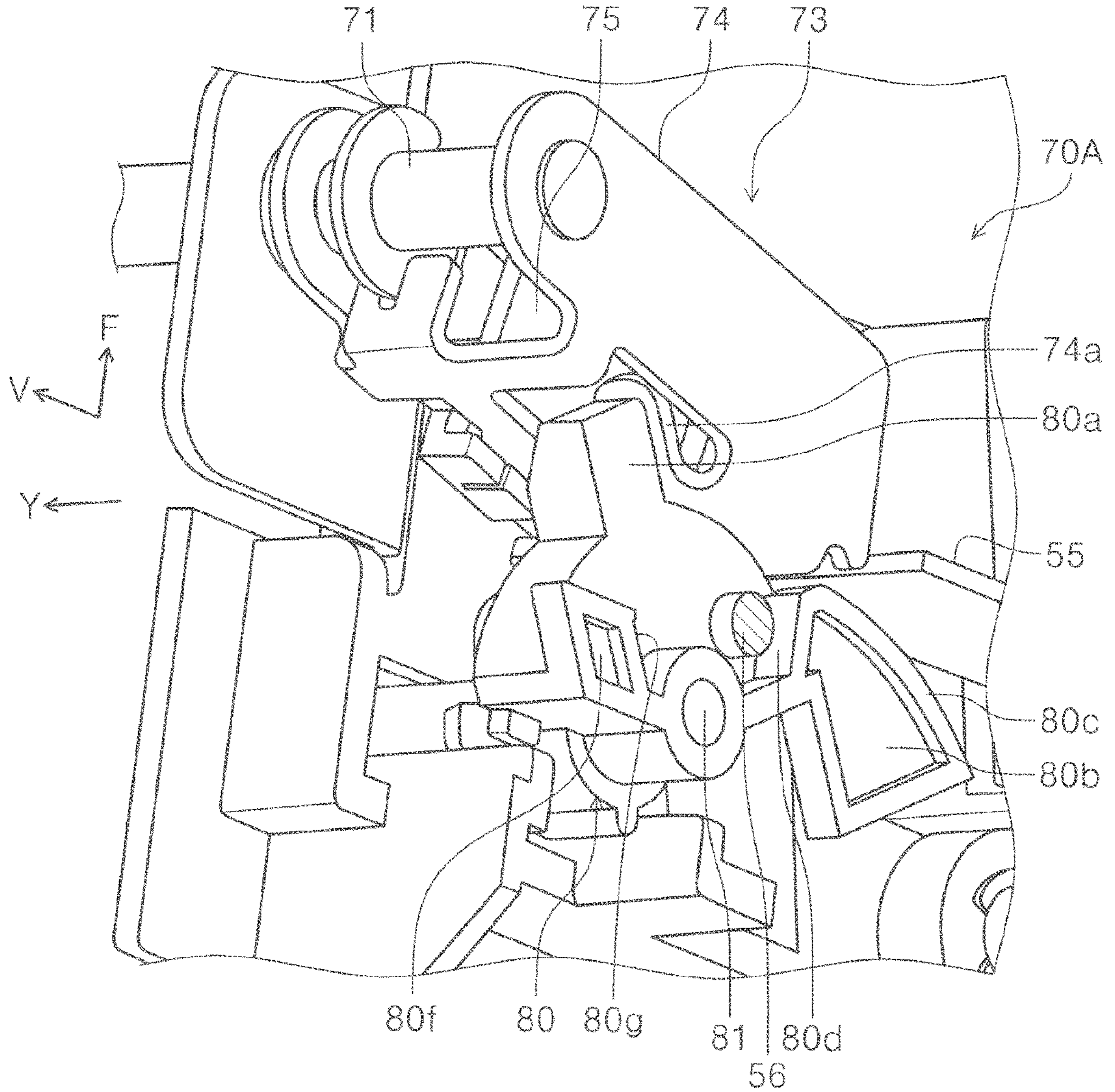
FIG. 12 is a perspective view illustrating the regulating unit provided in the −Y direction end.

As illustrated in FIGS. 11 and 12, the head unit 50 includes a pin member 56 corresponding to a contact section capable of coming into contact with the regulating unit 70A and a regulated frame 55 corresponding to a regulated section, which is a portion, movement of which in the +V direction is regulated at position F6. The regulated frame 55 is also illustrated in FIGS. 3 and 4. The regulated surface 55*a* is a surface which is formed such that the +V direction end of the regulated frame 55 extending in the V-axis direction is bent in the −F direction and which comes into contact with a lock section 73 described later.

The regulating unit 70A includes: the lock section 73 that rotates about the rotational shaft 71 to be thereby reciprocated with respect to a movement region of the regulated frame 55; and a cam 80 that rotates about a cam rotational shaft 81 parallel to the Y-axis direction to thereby switch the posture of the lock section 73. Note that, in the present embodiment, the rotational shaft 71 is a fixed shaft, and the lock section 73 is configured to rotate relative to the cam rotational shaft 81. Thus, the lock section 73 of the regulating unit 70A and the lock section 73 of the regulating unit 70B (refer to FIG. 9) are able to rotate independently.

The cam 80 includes a supporting section 80*a* capable of supporting the lock section 73 and a first portion 80*f* and a second portion 80*b* capable of coming into contact with the pin member 56 and is rotated by the pin member 56 in accordance with a moving operation of the head unit 50. The pin member 56 rotating the cam 80 will be specifically described below.

The lock section 73 is provided to be able to switch, by rotating, between a first posture (FIGS. 11, 12, and 16) in which the lock section 73 is advanced to the movement region of the regulated frame 55 to form the regulating state of the regulating unit 70A and a second posture (FIG. 14) in which the lock section 73 is separated from the movement region of the regulated frame 55 to form the non-regulating state of the regulating unit 70A.

The cam 80 is provided to be rotatable to switch between a first rotational phase (FIG. 14) in which the supporting section 80*a* supports the lock section 73 such that the lock section 73 takes the second posture (FIG. 14) and a second rotational phase (FIGS. 11, 12, 15, 16, and 17) in which the supporting section 80*a* terminates supporting of the lock section 73 to enable the lock section 73 to be switched from the second posture to the first posture.

Figure 14:
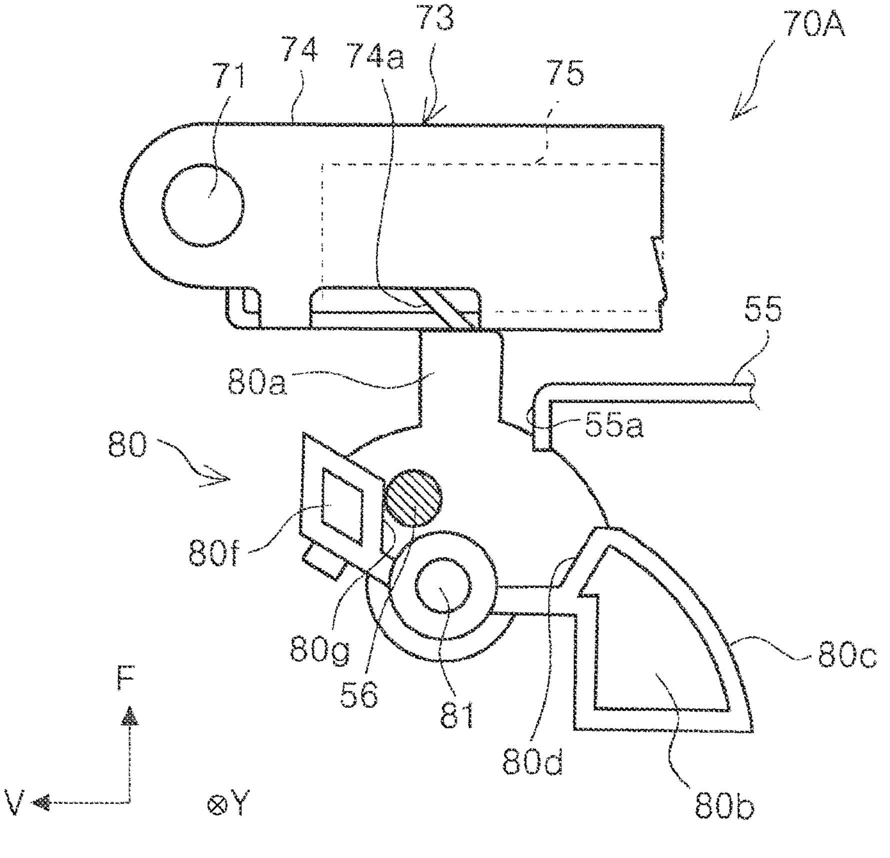
FIG. 14 is a front view of the regulating unit and illustrates a non-regulating state.

Note that, in the present embodiment, the lock section 73 is not pressed in a specific rotational direction by a pressing member such as a spring and is in a state of being mounted on the supporting section 80*a* due to the weight of the lock section 73 in the state illustrated in FIG. 14, for example.

Similarly, the cam 80 is not pressed in a specific rotational direction by a pressing member such as a spring. However, the cam 80 is provided such that a predetermined frictional force is generated at the time of rotation to suppress unintentional rotation due to vibration, impact, or the like.

Next, in FIG. 11, the lock section 73 includes a holder member 74 capable of rotating about the rotational shaft 71 and a sliding member 75 capable of sliding with respect to the holder member 74. The sliding member 75 is a member held by the holder member 74 and capable of coming into contact with the regulated frame 55 and is held so as to be slidable with respect to the holder member 74 in a radial direction of the rotational shaft 71. Here, the radial direction of the rotational shaft 71 includes a movement direction component of the regulated frame 55, that is, a V-axis direction component.

The sliding member 75 is pressed by a coil spring 76, which is an example of a pressing member, in a direction which extends in the radial direction of the rotational shaft 71 and in which the sliding member 75 is pressed against the regulated frame 55.

An operation of switching the regulating unit 70A configured as described above between the non-regulating state and the regulating state will be described below.

When recording is performed on the medium, the head unit 50 is at position F1 in FIG. 13. In this state, the regulating unit 70A has the state illustrated in FIG. 14, the lock section 73 takes the second posture, and the cam 80 has the first rotational phase.

In this state, the first portion 80*f* of the cam 80 is advanced to the movement region of the pin member 56 provided in the head unit 50, and a first-portion contact surface 80*g*, which is the −V direction side surface, is in a state of being capable of coming into contact with the pin member 56 when the head unit 50 moves in the +V direction. Note that, in this state, the second portion 80*b* is not advanced to an advancing/retreating region of the pin member 56.

Figure 15:
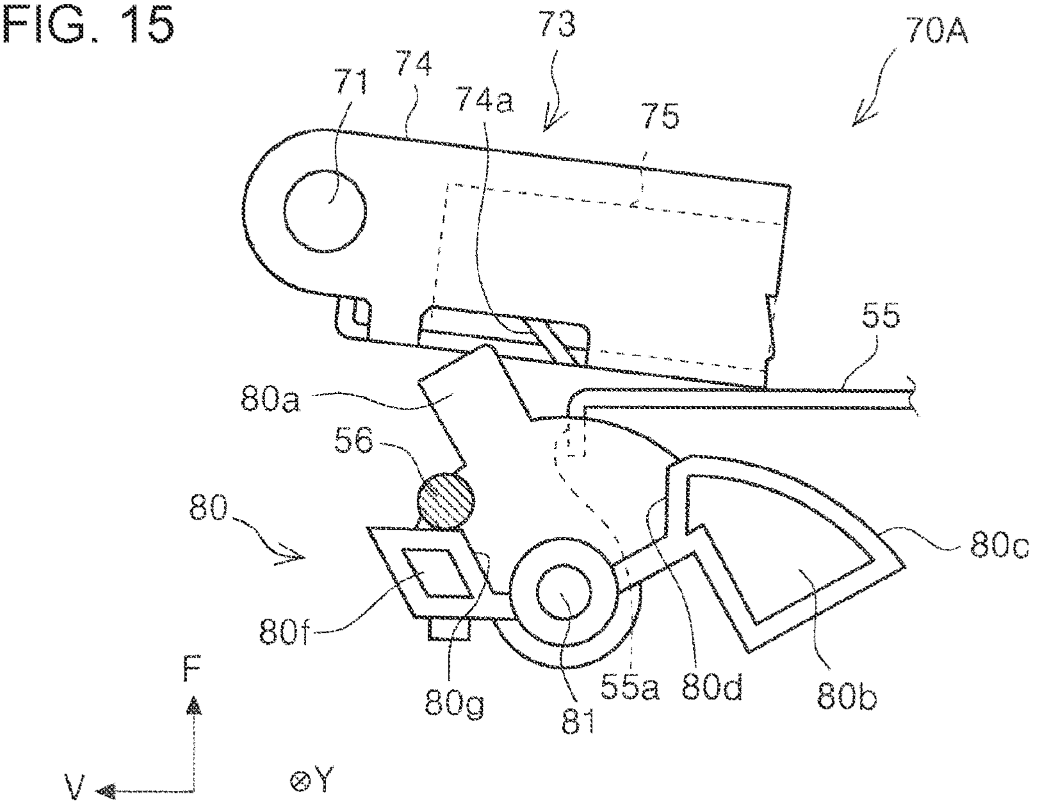
FIG. 15 is a front view of the regulating unit and illustrates a state in which the regulating unit is being switched to the regulating state.

When the head unit 50 moves in the +V direction from position F1 in FIG. 13 and reaches a position in front of position F4 by passing through position F3, the pin member 56 comes into contact with the first-portion contact surface 80*g* as illustrated in FIG. 14. When the head unit 50 further moves in the +V direction, the pin member 56 rotates the cam 80 such that the cam 80 has the second rotational phase. FIG. 15 illustrates a state in which the cam 80 rotates so as to have the second rotational phase. When the cam 80 rotates in this manner, the lock section 73 taking the second posture rotates to be mounted on the upper surface of the regulated frame 55. The position of the head unit 50 at this time is position F4 illustrated in FIG. 13. In this state, the regulating unit 70A has not been switched to the regulating state.

Note that, since position F4 is located in the +V direction with respect to position F3, when the head unit 50 is reciprocated between position F1 and position F3, the regulating unit 70A retains the non-regulating state in FIG. 14.

Figure 16:
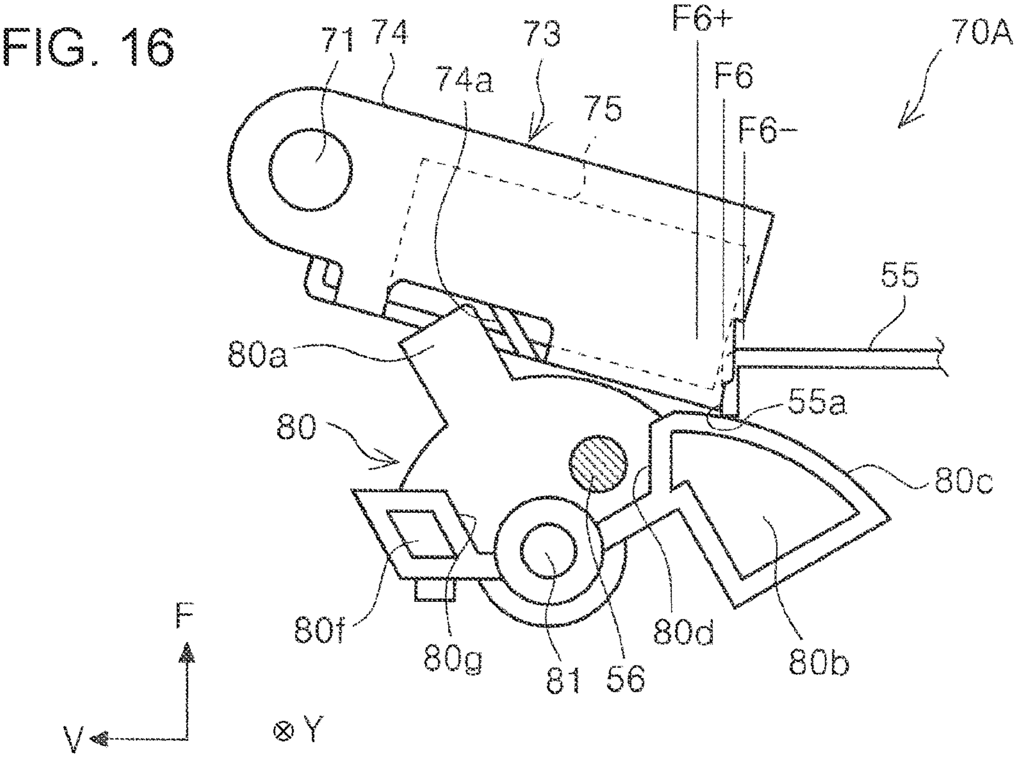
FIG. 16 is a front view of the regulating unit and illustrates the regulating state.

When the head unit 50 moves in the −V direction in a state in which the lock section 73 is mounted on the upper surface of the regulated frame 55 as illustrated in FIG. 15, the lock section 73 drops from the upper surface of the regulated frame 55 and is switched to the first posture as indicated by the change from FIG. 15 to FIG. 16. That is, the regulating unit 70A is switched to the regulating state. The position of the head unit 50 at this time is position F6− located slightly further than position F6 in the −V direction, which will be specifically described later.

In this state, that is, in the second rotational phase of the cam 80, the second portion 80*b* is advanced to the advancing/retreating region of the pin member 56 such that the pin member 56 is able to come into contact with a second-portion contact surface 80*d*, which is the +V direction surface of the second portion 80*b*. Accordingly, when the head unit 50 moves in the −V direction in the state illustrated in FIG. 16, that is, a state in which the cam 80 has the second rotational phase and in which the lock section 73 takes the first posture, the pin member 56 comes into contact with the second-portion contact surface 80*d* to rotate the cam 80 such that the cam 80 has the first rotational phase, and the state returns to the state illustrated in FIG. 14. The position of the head unit 50 when the cam 80 is switched to the first rotational phase is position F7 in FIG. 13.

Note that a guiding surface 74*a* that functions as a guide when the supporting section 80*a* pushes up the lock section 73 is formed in a bottom portion of the holder member 74 (also refer to FIG. 12).

Figure 19:
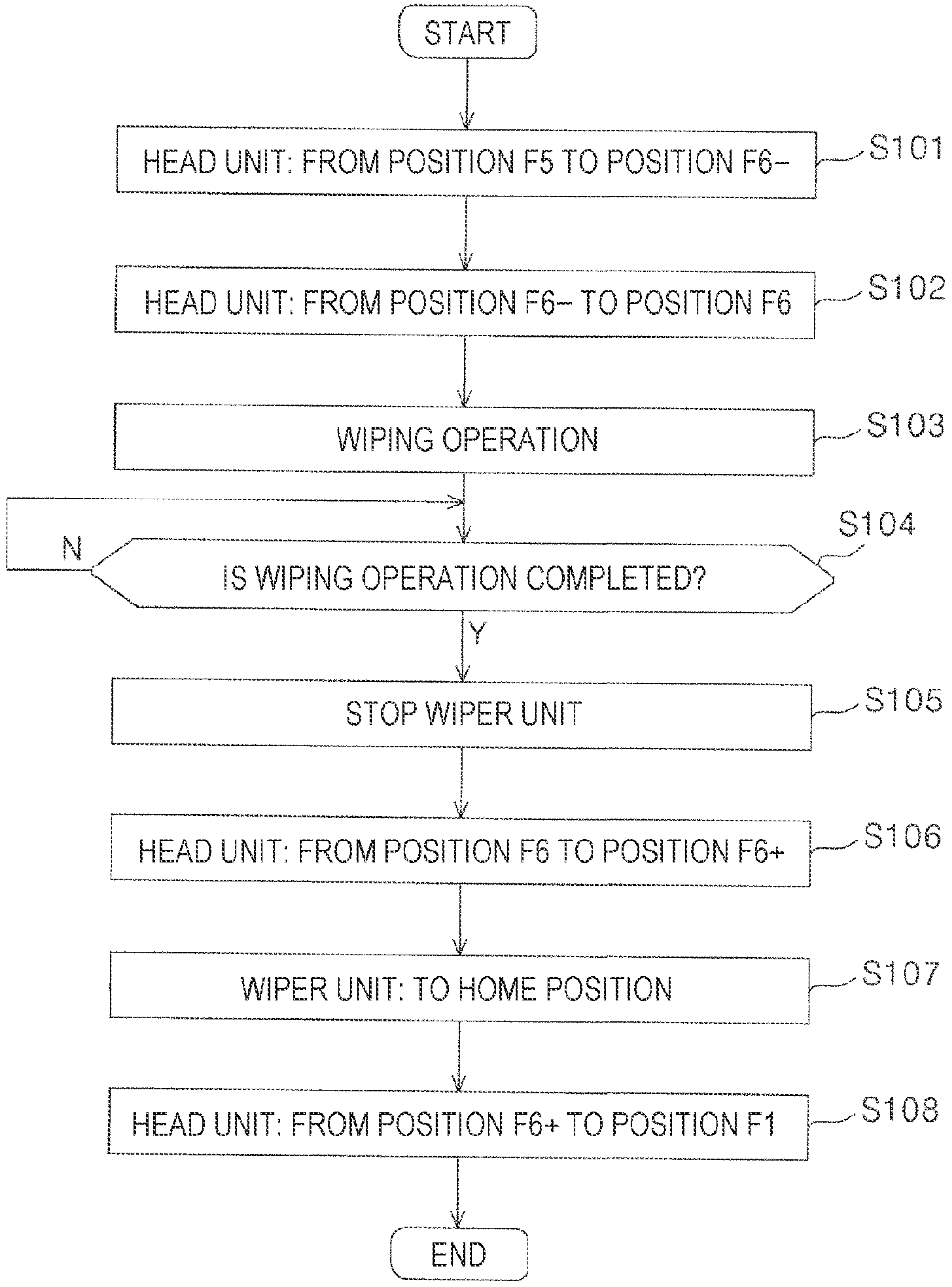
FIG. 19 is a flowchart of control performed when the state of the regulating unit is switched.

Next, control during the wiping operation will be described with reference to FIG. 19 and other drawings as necessary. Note that, for convenience of description, FIG. 19 illustrates control performed from when the head unit 50 has reached position F5 in FIG. 13.

When moving the head unit 50 in the −V direction from position F5 in FIG. 13 to perform the wiping operation, first, the control section 58 (refer to FIGS. 3 and 4) moves the head unit 50 to position F6− (refer to FIG. 16) (step S101). The lock section 73 is thereby switched to the first posture, and the regulating unit 70A has the regulating state. At this time, the sliding member 75 that constitutes the lock section 73 is in a state of being located furthest in the −V direction in the holder member 74 due to a spring force of the coil spring 76 (refer to FIG. 11).

Next, the head unit 50 is moved from position F6− to position F6 (step S102). FIG. 16 illustrates a state in which the head unit 50 has moved from position F6− to position F6, and, in this state, the sliding member 75 is in a state of being slightly moved in the +V direction against the spring force of the coil spring 76 (refer to FIG. 11). That is, the spring force of the coil spring 76 (refer to FIG. 11) acts on the regulated frame 55, and the state is such that movement of the regulated frame 55, that is, the head unit 50, in the +V direction is regulated.

As described above, the printer 1 includes the regulating units 70A and 70B that are able to switch between the regulating state in which regulating of movement of the head unit 50 in the +V direction is performed and the non-regulating state in which the regulating is not performed and have the regulating state when the head unit 50 is at position F6, which is an example of the second position, that is, a position at which wiping is performed. Thus, it is possible to suppress the head unit 50 from moving in a direction away from the wiper 44 due to a force applied by the wiper 44 (refer to FIG. 2) to the ink ejection surface 51*a* during the wiping operation and appropriately wipe the ink ejection surface 51*a*.

Note that, in the regulating state, the regulating unit 70A (70B) of the present embodiment regulates movement of the head unit 50 in the +V direction but does not regulate movement of the head unit 50 in the −V direction. However, the regulating unit may regulate movement of the head unit 50 in the +V direction and the −V direction.

In particular, since the moving unit 60 described with reference to FIGS. 3 to 8 includes the rack-and-pinion mechanism, a problem of the head unit 50 moving in the direction away from the wiper 44 due to being subjected to a force from the wiper 44 is readily caused by backlash of a gear. However, the regulating unit 70A (70B) is able to suppress the head unit 50 from moving in the direction away from the wiper 44, thus making it possible to appropriately wipe the ink ejection surface 51*a*.

Note that, for the head unit 50 not to be moved by the fore received from the wiper 44 (refer to FIG. 2) during the wiping operation, a pressing force of the coil spring 76 (refer to FIG. 11) for pressing the sliding member 75 is set to such a magnitude that the position of the sliding member 75 with respect to the holder member 74 is retained during the wiping operation. However, the magnitude of the pressing force of the coil spring 76 is set such that the sliding member 75 is allowed to displace in the +V direction when the head unit 50 moves in the +V direction.

When the head unit 50 is driven in the +V direction by the motor 59 as described above, it is possible to move the head unit 50 to some extent against the spring force of the coil spring 76. According to such a configuration, it is possible to finely adjust the relative positions of the wiper 44 and the ink ejection surface 51*a* and appropriately wipe the ink ejection surface 51*a*.

With reference to FIG. 19, when the wiping operation (step S103) is completed (Yes in step S104), the wiper unit 43 is stopped (step S105). In this state, the wiper 44 is still in a state of being deformed by being pressed against the ink ejection surface 51*a*.

Here, in an instance in which the wiper 44 separates from the ink ejection surface 51*a* upon movement of the wiper unit 43 in this state, when the wiper 44 returns to an original shape due to elasticity, ink adhering to the wiper 44 may be scattered. Thus, the control section 58 moves the head unit 50 in the +V direction before the wiper 44 separates from the ink ejection surface after the wiper 44 completes wiping of the ink ejection surface 51*a*. More specifically, the control section 58 moves the head unit 50 from position F6 to position F6+ (refer to FIG. 16) (step S106). Position F6+ is a position at which the ink ejection surface 51*a* is separated from the wiper 44. Such control is able to suppress the problem of scattering ink described above.

When the ink ejection surface 51*a* separates from the wiper 44, the wiper unit 43 is returned to the home position (step S107), and the head unit 50 is moved from position F6+ to position F1 (step S108).

Other features of the present embodiment will be described below.

Since the regulating unit 70A (70B) is configured to have a state switched by the head unit 50 in accordance with a moving operation of the head unit 50, a power source for switching between the regulating state and the non-regulating state is not required, thus making it possible to suppress a cost increase and a size increase of the apparatus.

The regulating unit 70A (70B) is able to switch the posture of the lock section 73 upon rotation of the cam 80, and the configuration of switching the state in accordance with the moving operation of the head unit 50 is able to be formed with a small number of components while suppressing a size increase.

Note that the regulating unit may switch between the regulating state and the non-regulating state by using a dedicated driving source. For example, the configuration may be such that a solenoid is used and movement of the head unit 50 in the +V direction is regulated by a plunger that performs an advancing/retreating operation.

Note that the regulating unit 70A (70B) may include, instead of the cam 80, another member for switching the posture of the lock section 73.

In FIG. 13, the head unit 50 is able to move to position F3 corresponding to a position further than position F6, at which movement in the +V direction is regulated, in the +V direction, and when the head unit 50 moves from position F1 to position F3 and when the head unit 50 moves from position F3 to position F1, the regulating unit 70A (70B) retains the non-regulating state. Thus, when the head unit 50 periodically moves between position F1 and position F3 for the flushing operation during the operation of performing recording on the medium, the regulating unit 70A (70B) does not hinder the movement, and the head unit 50 is able to move smoothly. Route L1 in FIG. 13 conceptually indicates a route for returning to position F1 after the flushing operation ends. Note that position F3 is not limited to the position at which the flushing operation is performed and may be a position at which different processing is performed.

Figure 17:
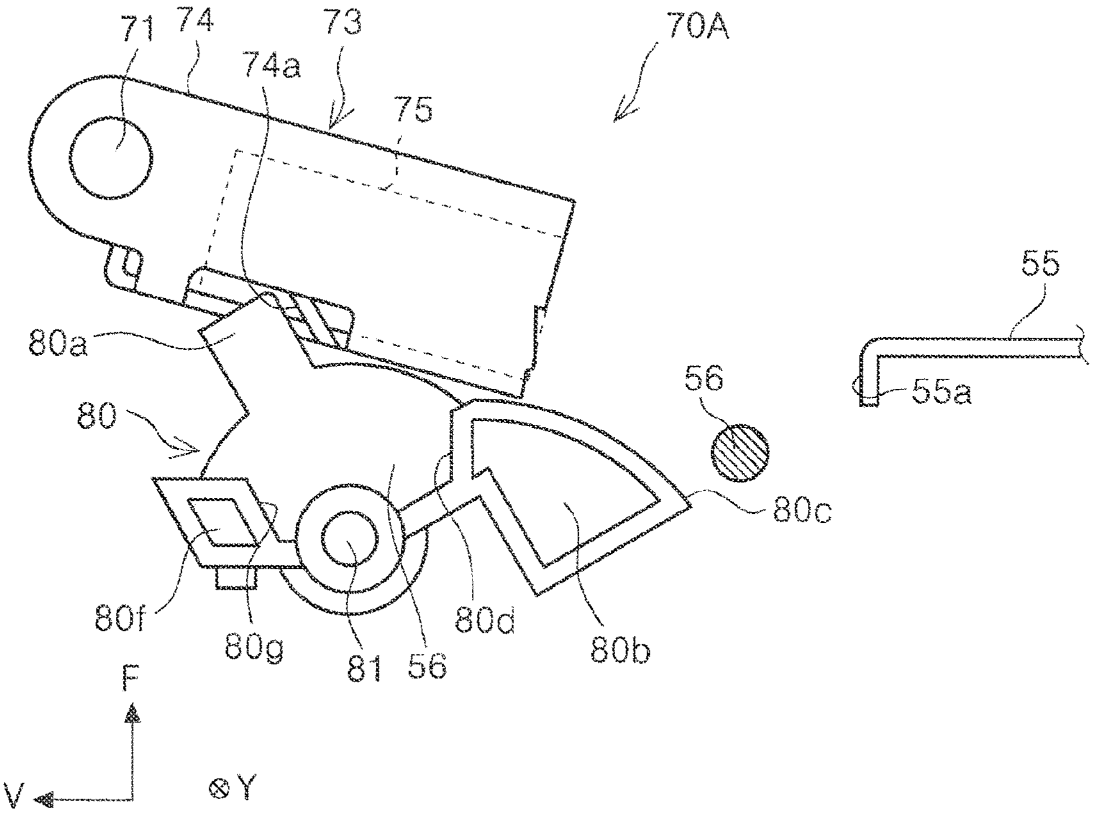
FIG. 17 is a front view of the regulating unit and illustrates an irregular state.
Figure 18:
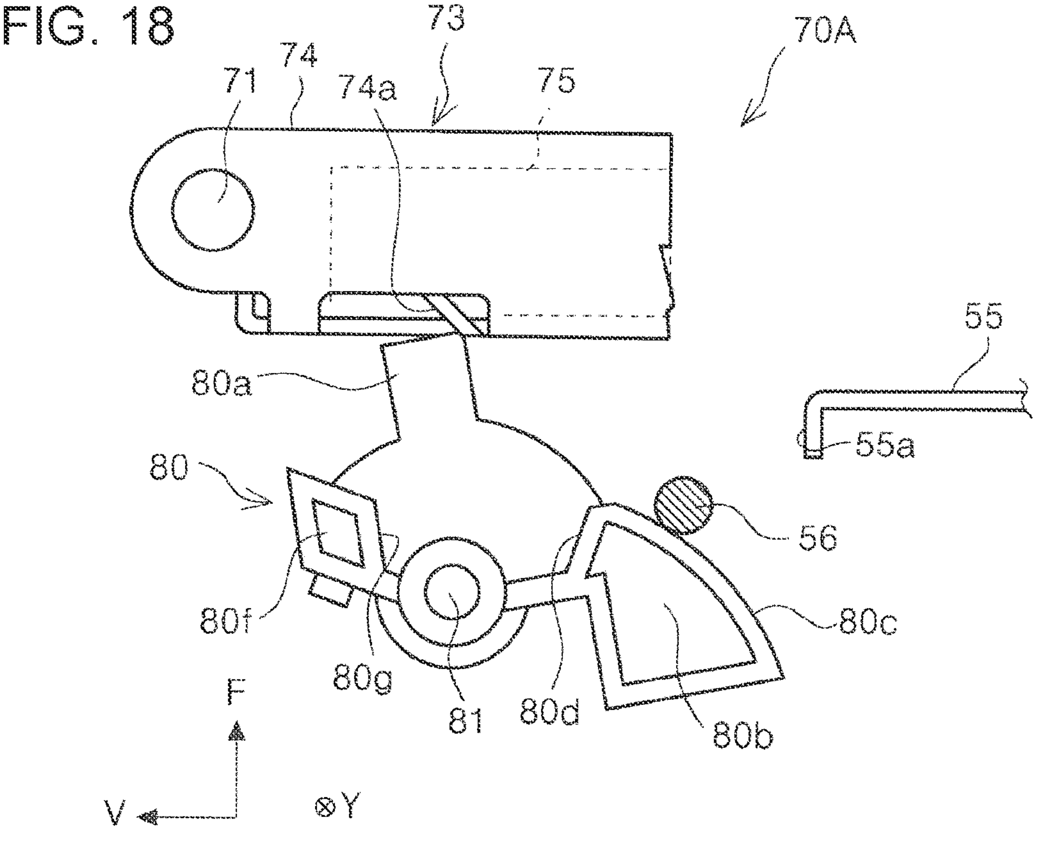
FIG. 18 is a front view of the regulating unit and illustrates a state in which the irregular state is being terminated.

As illustrated in FIG. 17, the second portion 80*b* of the cam 80 includes a cam surface 80*c* capable of coming into contact with the pin member 56 that moves in the +V direction from position F1 in a state in which the cam 80 has the second rotational phase. When the head unit 50 moves in the +V direction in a state in which the pin member 56 is in contact with the cam surface 80*c*, the cam 80 rotates so as to have the first rotational phase as indicated by the change from FIG. 17 to FIG. 18 and is able to finally return to the state in FIG. 14.

That is, the regulating unit 70A (70B) is configured to be switched from the non-regulating state to the regulating state when the head unit 50 moves in the +V direction further than position F3 and then moves in the –V direction. Meanwhile, in an instance in which the regulating unit 70A (70B) has already been switched to the regulating state due to any irregular event, such as vibration or impact, when the head unit 50 is to move from position F1 to position F3, the head unit 50 is not able to move to position F3, that is, the flushing position.

However, as described above, when the head unit 50 moves in the +V direction in the state in which the pin member 56 is in contact with the cam surface 80*c*, the regulating unit 70A (70B) is able to be returned to the non-regulating state, and the head unit 50 is able to move to position F3, that is, the flushing position.

Note that the position of the head unit 50 when the pin member 56 comes into contact with the cam surface 80*c* such that the cam 80 is switched to the first rotational phase is position F2 in FIG. 13.

In the present embodiment, when moving to position F5 in FIG. 13, the head unit 50 is attachable to or detachable from the apparatus main body 2. That is, the head unit 50 is able to move to the recording position, the wiping position, the flushing position, and the attachment/detachment position in the V-axis direction.

Note that order of positions to which the head unit 50 is movable may be changed. For example, the wiping position may be located in the –V direction with respect to the recording position. The configuration may be such that, after the transport belt 13 separates from the recording-time transport path T1, the head unit 50 moves in the –V direction from the recording position to perform wiping. Moreover, the wiping position may be located in the +V direction with respect to the flushing position or the attachment/detachment position. Note that the head unit 50 may move to a position other than the four positions described above.

Needless to say, the disclosure is not limited to the embodiment described above, various modifications can be made within the scope of the disclosure described in the claims, and these modifications are also included within the scope of the disclosure.

What is claimed is:

1. A recording apparatus comprising:

a transport path on which a medium is transported;

a recording section that includes a liquid ejecting section for ejecting a liquid onto the medium and that is configured to move between a first position at which the liquid ejecting section performs recording on the medium transported on the transport path and a second position at which the recording section is retreated from the transport path;

a moving unit that moves the recording section in a first direction in which the recording section retreats from the transport path and a second direction in which the recording section advances to the transport path;

a wiper that wipes a liquid ejection surface of the liquid ejecting section by moving in a direction extending along the liquid ejection surface when the recording section is at the second position; and a regulating unit that is configured to switch between a regulating state in which regulating of movement of the recording section in the first direction is performed and a non-regulating state in which the regulating is not performed and that has the regulating state when the recording section is at the second position.

2. The recording apparatus according to claim 1, wherein a movement direction of the recording section intersects a horizontal direction and a vertical direction.

3. The recording apparatus according to claim 2, wherein the movement direction of the recording section forms an acute angle smaller than 45° with respect to the horizontal direction.

4. The recording apparatus according to claim 3, wherein the moving unit includes a rack-and-pinion mechanism.

5. The recording apparatus according to claim 4, wherein the regulating unit is configured to be switched by the recording section in accordance with a moving operation of the recording section.

6. The recording apparatus according to claim 5, wherein the regulating unit does not regulate movement of the recording section in the second direction when the regulating unit is in the regulating state.

7. The recording apparatus according to claim 6, wherein the recording section is configured to move to a third position even further than the second position in the first direction, and when the recording section moves from the first position to the third position and when the recording section moves from the third position to the first position, the regulating unit retains the non-regulating state.

8. The recording apparatus according to claim 1, wherein the regulating unit is configured to be switched by the recording section in accordance with a moving operation of the recording section.

9. The recording apparatus according to claim 8, wherein the recording section is configured to move to a third position even further than the second position in the first direction, and when the recording section moves from the first position to the third position and when the recording section moves from the third position to the first position, the regulating unit retains the non-regulating state.

10. The recording apparatus according to claim 9, wherein the recording section includes a contact section that is configured to come into contact with the regulating unit and a regulated section that is a portion, movement of which in the first direction is regulated at the second position, the regulating unit includes a lock section that is reciprocated with respect to a movement region of the regulated section by rotating and a cam that is a member for switching a posture of the lock section by rotating, that includes a supporting section which is configured to support the lock section and a first portion and a second portion which are configured to come into contact with the contact section, and that is rotated by the contact section in accordance with the moving operation of the recording section, the lock section is configured to switch between a first posture in which the lock section is advanced to the movement region of the regulated section to form the regulating state and a second posture in which the lock section is separated from the movement region of the regulated section to form the non-regulating state, the cam is configured to rotate to switch between a first rotational phase in which the supporting section supports the lock section such that the lock section takes the second posture and a second rotational phase in which the supporting section terminates supporting of the lock section to enable the lock section to be switched from the second posture to the first posture, when the recording section moves in the first direction even further than the third position in a state in which the cam has the first rotational phase, the contact section comes into contact with the first portion such that the cam is rotated so as to have the second rotational phase, and the lock section taking the second posture thereby rotates to be mounted on an upper surface of the regulated section, when the recording section moves in the second direction in a state in which the lock section is mounted on the upper surface of the regulated section, the lock section drops from the upper surface of the regulated section to be switched to the first posture, and when the recording section moves in the second direction in a state in which the cam has the second rotational phase and in which the lock section takes the first posture, the contact section comes into contact with the second portion to rotate the cam such that the cam has the first rotational phase.

11. The recording apparatus according to claim 10, wherein the second portion of the cam includes a cam surface that is configured to come into contact with the contact section of the recording section that moves in the first direction from the first position in a state in which the cam has the second rotational phase, and when the recording section moves in the first direction in a state in which the contact section is in contact with the cam surface, the cam rotates so as to have the first rotational phase.

12. The recording apparatus according to claim 10, wherein the lock section includes a holder member that is configured to rotate, a sliding member that is held by the holder member and that is configured to come into contact with the regulated section and configured to slide with respect to the holder member in a direction including a movement direction component of the regulated section, and a pressing member that is held by the holder member and presses the sliding member in a direction in which the sliding member is pressed against the regulated section, and a pressing force of the pressing member for pressing the sliding member is set to such a magnitude that a position of the sliding member with respect to the holder member is retained when the wiper wipes the liquid ejection surface.

13. The recording apparatus according to claim 12, further comprising:

a motor corresponding to a power source of the moving unit; and a control unit that controls the motor, wherein the control unit moves the recording section in the first direction to separate the liquid ejection surface from the wiper before the wiper separates from the liquid ejection surface after the wiper completes wiping of the liquid ejection surface.

14. The recording apparatus according to claim 8, wherein the recording section is configured to move to a third position further than the second position in the second direction, and when the recording section moves from the first position to the third position and when the recording section moves from the third position to the first position, the regulating unit retains the non-regulating state.

15. The recording apparatus according to claim 1, wherein the regulating unit does not regulate movement of the recording section in the second direction when the regulating unit is in the regulating state.

* * * * *